United States Patent
Orémuš et al.

(10) Patent No.: US 12,444,569 B2
(45) Date of Patent: Oct. 14, 2025

(54) ENDPOINTING WITH DETERMINATION OF REMAINING DISTANCE

(71) Applicant: FEI Company, Hillsboro, OR (US)

(72) Inventors: Zoltán Orémuš, Brno (CZ); Lukáš Hübner, Jiříkovice (CZ); Jaroslav Stárek, Olomouc (CZ); Tomáš Onderlička, Brno (CZ)

(73) Assignee: FEI Company, Hillsboro, OR (US)

( * ) Notice: Subject to any disclaimer, the term of this patent is extended or adjusted under 35 U.S.C. 154(b) by 532 days.

(21) Appl. No.: 18/084,412

(22) Filed: Dec. 19, 2022

(65) Prior Publication Data

US 2023/0307209 A1  Sep. 28, 2023

Related U.S. Application Data

(60) Provisional application No. 63/322,577, filed on Mar. 22, 2022.

(51) Int. Cl.
*H01J 37/305* (2006.01)
*H01J 37/28* (2006.01)

(52) U.S. Cl.
CPC .......... *H01J 37/3056* (2013.01); *H01J 37/28* (2013.01); *H01J 2237/2802* (2013.01); *H01J 2237/30466* (2013.01); *H01J 2237/31745* (2013.01)

(58) Field of Classification Search
CPC ............ H01J 37/3056; H01J 37/28; H01J 2237/2802; H01J 2237/30466; H01J 2237/31745; H01J 2237/221; H01J 37/244; H01J 37/265; H01J 37/304; G06T 2207/10061; G06T 2207/20061; G06T 2207/30164; G06T 7/74; G06T 1/0007; G01N 1/32; G01N 1/286; G01N 2001/2873; H01L 22/12; H01L 22/26

USPC .................................................. 250/306, 307
See application file for complete search history.

(56) References Cited

U.S. PATENT DOCUMENTS

| | | | |
|---|---|---|---|
| 11,264,200 B1 | 3/2022 | Onderlicka et al. | |
| 2007/0164215 A1* | 7/2007 | Walter | H01J 37/26 250/307 |
| 2010/0140470 A1* | 6/2010 | Shachal | H01J 37/301 277/648 |

OTHER PUBLICATIONS

Duda et al., "Use of the Hough Transformation To Detect Line and Curves in Pictures," *Graphics and Image Processing*, 15(1) pp. 11-15 (Jan. 1972).

(Continued)

*Primary Examiner* — Michael Maskell
(74) *Attorney, Agent, or Firm* — Klarquist Sparkman, LLP

(57) ABSTRACT

Methods and apparatus are disclosed for determining a distance from a cut face of an active sample to a target plane, using data acquired from a reference sample. The active and reference samples have congruent structure, allowing reference data to be used as an index. An SEM image of the cut face is compared with the reference data to determine position within the active sample, and thereby the remaining distance to the target plane. The technique can be applied repeatedly between phases of ion beam milling until an endpoint at the target plane is reached. Consistent, accurate endpointing is achieved. The technique is suitable for preparing 5-100 nm thick lamella for TEM analysis of electronic circuits and can be used in a wide range of applications. Variations are disclosed.

27 Claims, 12 Drawing Sheets

(56) References Cited

OTHER PUBLICATIONS

Evangelidis et al., "Parametric Image Alignment Using Enhanced Correlation Coefficient Maximization," *IEEE Transactions on Pattern Analysis and Machine Intelligence,* 30(10) pp. 1858-1865 (Oct. 2008).

Ledig et al., "Semantic Parsing of Brain MR Images," pp. 1-42, (preprint submitted to Elsevier) (also published as, Ledig et al., "Semantic Parsing of Brain MR Images", In: Zhou, K. ed. *Medical Image Recognition, Segmentation and Parsing: Machine Learning and Multiple Object Approaches (1st Edition), Academic Press,* pp. 307-336 (2015)).

OpenCV, "Hough Line Transform," downloaded on Mar. 17, 2022, from https://docs.opencv.org/3.4/d9/db0/tutorial_hough_lines.html, pp. 1-5.

OpenCV, "Template Matching," downloaded on Dec. 13, 2022, from https://docs.opencv.org/3.4/de/da9/tutorial_template_matching.html, pp. 1-7.

Wikipedia, "Hough Transform," downloaded on Mar. 17, 2022, from https://en.wikipedia.org/wiki/Hough_transform, pp. 1-10 (Mar. 2022).

* cited by examiner

ENDPOINTING WITH DETERMINATION OF REMAINING DISTANCE

CROSS-REFERENCE TO RELATED APPLICATIONS

This application claims the benefit of U.S. Provisional Application No. 63/322,577, filed on Mar. 22, 2022, which is incorporated herein by reference in its entirety.

BACKGROUND

Transmission electron microscopes (TEM) are increasingly used for analysis of semiconductor devices as well as for a wide range of material science and biology applications. A good quality TEM image can be obtained with a thin sample, known as a "lamella". Whereas a few years ago sample thicknesses were commonly around 100 nm, the state of the art has advanced and lamellas 10-20 nm thick are often desired. Producing lamellas of these thicknesses requires accurately reaching endpoints while reducing sample thickness, and has proven challenging. In one aspect, milling with open-loop depth control (having accuracy of about 10-100 nm) can result in low yield, as manufacturing attempts could variously result in punch-through (e.g. a hole, or zero nm thickness); in a lamella twice as thick as desired; or in a lamella that misses its target and does not contain a feature of interest. In another aspect, milling with closed-loop control requires accurate metrology. Conventional techniques such as laser or ultrasonic interferometry work well with macroscopic samples, but can be impractical on a lamella 10 nm thick and a few microns across. For example, a desired positional accuracy of 1 nm is about 0.1% of the emission wavelength of common metrology lasers. Accordingly, there remains a need for improved technologies for consistent, accurate endpointing during lamella production.

SUMMARY

In brief, examples of the disclosed technologies take advantage of structural reproducibility between like samples, or between regions of a single sample. That is, two congruent structures can be used, in a same sample device or in different sample devices. One structure can be designated a reference structure, and the other structure can be designated an active structure. An objective can be to etch the active structure to a predetermined target plane within the active structure. Examples of the disclosed technology use data acquired from the reference structure as an index. By comparing image data from the active structure with successive reference planes, a current etch position in the active structure can be determined accurately In a first aspect, the disclosed technologies can be implemented as an apparatus incorporating an imager and a controller. The imager is configured to generate an image of a cut face of the sample. The controller is configured to acquire an image of the cut face from the imager, compare the image to one or more references, determine thereby a distance value between the cut face and a target position, and store the distance value.

In some examples, the apparatus can also include an etcher. The controller can be further configured to cause the etcher to etch the sample beyond the cut face to a depth equal to the distance value, to within a tolerance range. Alternatively, the distance value can be a first distance value and the controller can be configured to cause the etcher to iteratively etch the cut face in response to the determination of the first distance value. As the cut face is progressively etched, the acquiring, comparing, and determining operations can be repeated after each iteration to obtain successive distance values to the target position. The etcher can incorporate one or more of: an ion beam mill, a plasma etcher, a laser, or a gas-assist subsystem.

In further examples, the image and the cut face can be preceded by one or more preceding images at respective preceding positions on the sample. The controller can be configured to determine the distance value further based on comparisons between the one or more preceding images and the references. The references can include reference images of respective face positions. Each face position can have a predetermined respective reference distance to a reference target position. The comparing can include computing respective image correlations between the image and the reference images. The determining can include: (i) determining the distance value based on the reference distance of a given reference image, which has a highest value among the computed image correlations; or (ii) performing one-dimensional fitting of three or more of the computed image correlations as a function of the respective reference distances, and determining the distance value as corresponding to a maximum value of the function; or (iii) performing two-dimensional fitting on a plurality of image correlations spanning multiple positions of the cut face, to obtain a fitted relationship between the reference distances of the reference images and the multiple positions of the cut face, and determining the distance value based on a value of the fitted relationship at the current position of the cut face. The multiple image correlations can include the computed image correlations at a current position of the cut face together with preceding image correlations computed for one or more preceding positions of the cut face.

In other examples, the references can include reference values of attributes of first features at respective face positions. Each face position can have a predetermined respective reference distance to a common reference target position. The comparing can include identifying one or more second features in the image corresponding to the first features; determining corresponding attribute value(s) of the second feature(s); and comparing the determined attribute value(s) with the reference values. The comparing can indicate a given face position among the face positions which most closely matches the image. The determining can include: (i) determining the distance value based on the reference distance of the given face position; or (ii) based on one-dimensional fitting of results of the comparing as a function of the respective reference distances, determining the distance value as corresponding to an optimum value of the function; or (iii) based on two-dimensional fitting of results of comparing attribute values spanning multiple positions of the cut face with the reference values, obtaining a fitted relationship between the reference distances of the face positions and the multiple positions of the cut face, and determining the distance value based on a value of the fitted relationship at the current position of the cut face. The compared attribute values can include the determined attribute value(s) at a current position of the cut face, together with preceding attribute value(s) for one or more preceding positions of the cut face. The fitted relationship can be linear. The two-dimensional fitting can be performed graphically.

In additional examples, the image can be a front image, the cut face can be a front cut face, the target position can be a front target position, the distance value can be a first distance value, and the sample can have a back cut face opposite to the front cut face. The controller can be further configured to use an image of the back cut face to determine a second distance value between the back cut face and a back target position.

In further examples, the apparatus can include a rotatable stage upon which the sample can be mounted. The controller can be further configured to control the stage to rotate between a first orientation in which the imager can view the front cut face and a second orientation in which the imager can view the back cut face. In varying examples, the references can be obtained from the sample, or from another reference sample. The imager can be a scanning electron microscope (SEM).

In a second aspect, the disclosed technologies can be implemented as a method. An image of a cut face is acquired with the cut face at a first position on a sample. The image is compared with predetermined references from respective reference face positions. Based on the comparisons, a distance value from the first position to a target position is determined. The distance value is outputted.

In some examples, the method can further include etching the sample to obtain the cut face at the first position, prior to the acquiring operation. The comparing the image with the predetermined references can include computing respective closeness metric values between the image and each of the predetermined references. Each closeness metric value can be based on one or more of: an image similarity score between the image and the respective predetermined reference; or a difference between (i) a first value of a first attribute of a first feature for the respective predetermined reference, and (ii) a second value of the first attribute of a second feature extracted from the image. The first and second features can correspond to features in the respective predetermined reference and in the image, respectively. The determining can include: (i) determining the distance value based on a distance-to-target of a given reference having an optimum value among the closeness metric values; or (ii) performing one-dimensional fitting of three or more of the closeness metric values as a function of the respective reference face positions, and determining the distance value based on an optimum value of the function; or (iii) performing two-dimensional fitting on a plurality of metric values spanning multiple positions of the cut face, to obtain a fitted relationship between the reference face positions and the multiple positions of the cut face, and determining the distance value based on a value of the fitted relationship at the first position. The multiple metric values can include the closeness metric values computed for the first position together with preceding closeness metric values computed for one or more preceding positions of the cut face.

In further examples, the image and the cut face can be preceded by one or more preceding images at respective preceding positions on the sample. The determining can further be based on comparisons between the preceding images and the predetermined references. The first position and the preceding positions can collectively be denoted active slice positions.

In certain examples, the determining can include synthesizing another image comprising multiple pixels. Each pixel of the synthesized image can have a pixel coordinate corresponding to a respective one of the reference face positions along a first axis and a pixel coordinate corresponding to a respective one of the active slice positions along a second axis. A plurality of the pixels can have intensity values dependent on a closeness metric evaluated for the respective face position and the respective active slice position. Each reference face position can have a predetermined distance to a reference target position. Two-dimensional fitting can be performed on the synthesized image to obtain a line optimizing a predetermined criterion. Using the line, the first position can be mapped to a coordinate along the first axis which has a reference distance to the reference target position. The distance value can be set based on the reference distance of the coordinate. The two-dimensional fitting can be performed using a Hough transform or an adaptation of a Hough transform.

In additional examples, the image can be a front image, the cut face can be a front cut face, the target position can be a front target position, the distance value can be a first distance value, and the sample can have a back cut face opposite to the front cut face. A back image of the back cut face can be used to determine a second distance value between the back cut face and a back target position. Based on the determined distance value indicating that the first position is within a tolerance range about the target position, a lamella including at least a portion of the cut face can be detached from the sample. A notification indicating that the target position has been reached can be issued in response to the determined distance value indicating that the first position is at the target position to within a predetermined tolerance range. Alternatively, with the determined distance value indicating that the first position is outside a predetermined tolerance range about the target position, the sample can be further etched toward the target position. One or more etch control parameters can be modified prior to the further etching. The etching can progressively increase a depth of cut in a first direction. The sample can incorporate a structure having periodicity in the first direction. The sample can include a one dimensional, two-dimensional, or three-dimensional array of: semiconductor devices, optoelectronic devices, nanostructures, memory cells, memory interface circuits, or transistors. The etching can include one or more of: milling performed by a focused ion beam (FIB), plasma etching, laser etching, or gas-assisted milling.

In another aspect, the disclosed technologies can be implemented as computer-readable media storing executable instructions executable by one or more hardware processors. Upon execution of the instructions, the processor(s) can be actuated to: (a) cause an ion beam to mill a sample to a cut face at a current position; (b) acquire an image of the cut face from a scanning electron microscope (SEM); (c) compare the image with predetermined references from respective reference face positions, to determine a distance value indicating a separation between the current position and the target position; and (d) if the current position is within a tolerance range relative to the target position, issuing a notification indicating that the target position has been reached; and otherwise, causing the ion beam to resume milling the sample.

In some examples, the instructions can further actuate the one or more processors to acquire a sequence of reference images at the reference face positions, prior to the milling to the cut face at the current position. The predetermined references can be the reference images, and the comparing can include computing respective similarity scores between the acquired image and the reference images. The instructions can further actuate the one or more processors to: extract first features from the reference images; determine reference values of attributes of the first features, wherein the predetermined references are the reference values; identify one or more second features in the image of the cut face corresponding to the first features; and determine corresponding attribute value(s) of the second feature(s). The comparing the image with the predetermined references can include comparing the corresponding attribute value(s) with the reference values.

The foregoing and other objects, features, and advantages of the invention will become more apparent from the following detailed description, which proceeds with reference to the accompanying figures.

DETAILED DESCRIPTION

Introduction

Figure 1:
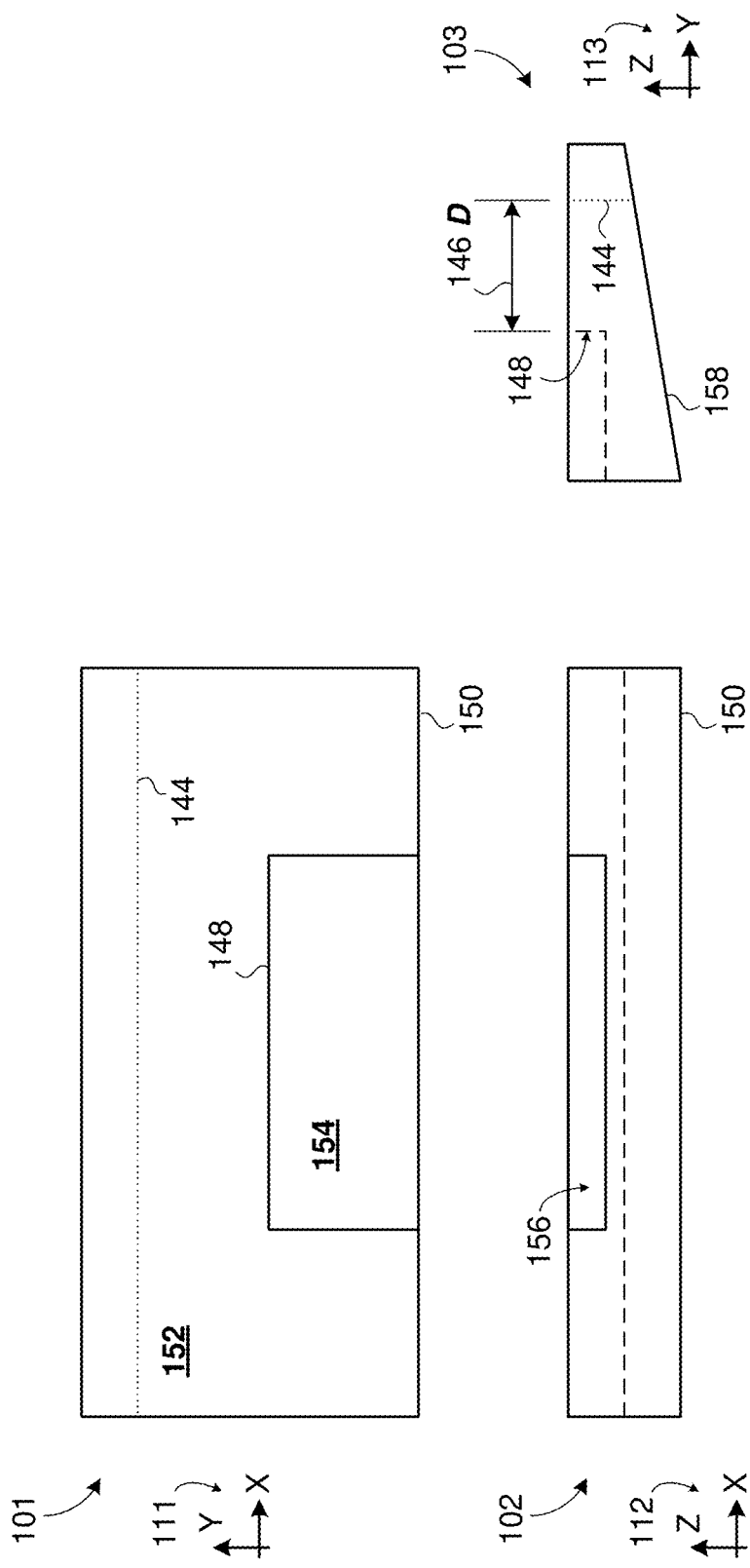
FIG. 1 shows views of a first example sample upon which the disclosed technologies can be performed.

Preparation of lamellas for TEM analysis imposes challenges, due to the dimensions and accuracies required. In particular, it is desirable to have an accurate estimate of a current etch position relative to a target position.

To achieve this, the disclosed technologies take advantage of structural reproducibility between like samples, or between regions of a single sample. That is, a reference structure can be used as an index or ruler to perform accurate metrology on a congruent active structure. An objective can be to etch the active structure to a predetermined target plane within the active structure. Because the structures are congruent, a corresponding target plane can be found in the reference structure. Here, "corresponding" means that the two target planes have a same spatial relationship to their respective structures, and therefore images or measurements on the two target planes can be expected to match up to the accuracy of manufacturing variations.

The reference structure can be etched from a starting surface through its target plane, collecting references at a succession of etch depths. The references can be SEM images, or values of feature attributes discernible at the various etch depths. For any given reference, the distance remaining to the reference target plane can be known.

Then, the active structure can be etched toward its own target plane. As etching proceeds, images or measurements can be made on a current cut face of the active structure. Using the references as an index, the current cut face can be placed within the sequence of references. To illustrate, the current cut face can be found to match a reference having a known distance of 20 nm to the reference target plane. Because the reference structure and the active structure are congruent, the current cut face can directly be determined to be 20 nm from its target plane in the active structure.

In examples, two target planes can be defined, for front-side and back-side etching respectively. To illustrate, if the two target planes are set 12 nm apart, and the active structure is etched from each side to the respective target plane with 1 nm accuracy, a lamella can be obtained having thickness 12 nm±2 nm. The same or different reference structures can be used for the front-side and back-side etch. Moreover, data from one reference structure can be reused multiple times on multiple active structures, for use in a statistical sampling or on-line production environment.

The disclosed technologies can be used with any pair of congruent structures, whether periodic or not. For samples having periodic structures, the reference structure and the active structure can be obtained at distinct regions of a same sample. While some described examples pertain to semiconductor samples, the disclosed technologies can provide advantageous improvement to endpointing accuracy in many etching applications on predictable or repeating structures. Accuracy or repeatability of 1 nm can be achieved, subject to presence of suitable feature variations in the structures.

Terminology

The usage and meaning of all quoted terms in this section applies throughout this disclosure unless clearly indicated otherwise or repugnant to the context. The terminology below extends to related word forms.

The term "active" denotes a sample upon which disclosed technologies are applied to determine a distance between a cut face and a target position. The term extends to the cut face, the image, or other data derived therefrom.

A "closeness metric" is a metric indicating a degree of similarity between data acquired at a cut face of an active structure and corresponding data for a reference structure. Comparison between features can result in a value of a closeness metric. In an example with a single feature attribute, the closeness metric can be simply the difference between the compared attribute values. To illustrate, a feature attribute value which is 10 nm in a reference image and 8 nm on the active sample can have a closeness metric value 8−10=−2 nm. The optimum value of such a closeness metric, which indicates a closest match, can be zero. In some variations, an absolute value of the difference can be used. In a second example with two feature attributes, a metric can be defined combining the two respective differences in a predetermined manner, which can be a weighted sum, a product, or another formula. To illustrate, if $d1$, $d2$ are the differences in value of the two attributes, a closeness metric can be calculated as $w1 \cdot |d2| + w2 \cdot |d2|$, where $w1$, $w2$ are predetermined weights; or as $|d1 \cdot d2|$. In such cases an optimum value of the closeness metric can be a minimum value of the closeness metric. The concept of closeness metric can also be extended to image correlations, where the closeness metric can be the image correlation itself, and can have an optimum value which is a maximum value of the closeness metric.

"Compare" refers to an act of determining a relationship between a given entity dubbed an "active" entity and one or more other entities dubbed "references". In some examples, the given entity and the references can be images or attribute values of image features. In some examples, the given entity and the reference(s) can be like objects (e.g. both images, or both values of corresponding feature attributes), but this is not a requirement. To illustrate, an image of an active sample can be compared with a reference attribute value by first extracting a corresponding attribute value and then comparing the corresponding attribute value with the reference attribute value. Comparing can include a variety of operations. Non-limiting examples of comparison operations include: determining a correlation between a given image and a reference image; determining a greater-than/equal/less-than relationship between two attribute values; interpolating or extrapolating a given value with respect to multiple reference values; determining a difference between two coordinates or distances; or determining whether a given position is within a reference tolerance range.

The term "congruent" is applicable to two structures that would coincide, to within manufacturing variations, if they could be translated and rotated appropriately to be superposed.

A "controller" is an electronic device coupled to one or more actuators to effect a change in a physical parameter, or coupled to one or more sensors to monitor a physical parameter. Some controllers can include a microprocessor which can be programmed to execute machine readable instructions. The descriptions herein of computing devices are generally applicable to such controllers. Such controllers can include additional electronic circuitry such as filters and amplifiers. Other controllers can include analog circuitry such as filters and amplifiers without any microprocessors.

A "coordinate" is a number, optionally with a unit, that indicates a position or orientation of a point or object in space. Common coordinates can be linear or angular.

A "cut face" (sometimes, "slice") is a surface of a sample exposed by etching. While cut faces are often planar, this is not a requirement, and some cut faces can be curved.

"Depth" refers to a direction in which a cut face (or an edge of a cut face) moves during etching. The depth direction is often normal to the cut face, but this is not a requirement.

"Distance" is a measure of length. A distance can be between two features on a sample or in an image of the sample, or between a feature and a reference. A cut face is a feature, and one distance of interest herein is a distance between a cut face and a target position, which can be measured in a depth direction or normal to the cut face. The feature or reference need not be physically discernible on or within the sample. For example, a target plane or other reference position can be defined with respect to other discernible features, e.g. at a midpoint between such features. As another example, a distance can be defined between a current cut face and a past or subsequent cut face. In some examples, a "distance value" can be numerical (e.g. 1.3 μm, 50 nm, or another distance), but this is not a requirement. In other examples, a distance value can be a logical or other value associated with a distance. To illustrate, a distance value can be set to True indicating that an instant distance is within a tolerance range, or set to False to indicate that the distance is outside the tolerance range.

An "electron microscope" is a type of analytic equipment in which a sample is illuminated by an electron beam, and resulting particles or electromagnetic radiation are used to form a spatially resolved image. A scanning electron microscope (SEM) images a sample surface based on reflected, secondary, or backscattered particles or radiation from one or more surfaces of the sample. Because beam interactions detected by a SEM occur at or near this surface, a SEM can operate on samples of arbitrary thickness. In contrast, a transmission electron microscope (TEM) images a sample volume based on transmitted electrons (including scattered electrons). A TEM operates on samples of about 10-150 nm thickness, which can be mounted on a grid for mechanical support and thermal conductivity; in turn the grid can be held in a sample holder. A TEM can provide magnifications up to and exceeding 50 million, while SEM magnifications are commonly limited to about 2 million. In this disclosure, scanning transmission electron microscopes (STEM), which perform imaging of transmitted electrons, are considered to be both SEMs and TEMs. In disclosed examples, a SEM can be used to monitor etching prior to and upon reaching a target position. Disclosed examples can be used to obtain a lamella for subsequent TEM analysis.

"Etching" refers generally to any subtractive process for removing material from a sample. Etching can expose one or more cut faces of a sample by removing material up to and on one side of the cut face. Non-limiting examples of etching techniques include laser etching, plasma etching, ion beam milling, and gas-assisted milling. While etching results in material removal, an etching process can include preparatory or intermediate operations that are additive. For example, a photoresist can be deposited onto a sample and patterned, so as to obtain a patterned etch in a subsequent operation.

A "feature" is a structure or other variation in material composition of a sample that is discernible in an image of the sample. Exemplary features in a semiconductor device sample can include components of a memory cell, a transistor, or a metallization pattern. A feature can have one or more "attributes", which are discernible parameters associated with the image. Exemplary attributes can include an absolute or relative coordinate of the feature in the image, a size or extent of the feature, an absolute or relative intensity of the feature, or a derived quantity such as the ratio of two distances or two sizes, or a gradient of image intensity. An attribute can have one or more "values", which can be obtained by measurement or observation of the attribute. While attributes often have numerical values, this is not a requirement, and some attribute values can be logical values (e.g. whether the feature is present or absent), strings (e.g. describing the feature), or data structures (e.g. a tuple of two or three coordinates of a position).

"Fitting" (or, "performing a fit") refers to a procedure that determines, for a parameterized function, parameter values that optimize agreement between a set of two or more data points and the parameterized function, according to a predetermined criterion. In some examples, the predetermined criterion can be minimization of a sum of squares of deviations between the data points and the parameterized function and the fitting can be referred to as a least-squares fit. Alternatively, other criteria can be used. In some examples, the parameterized function can be visualized as a line, a circle, a periodic waveform, or another geometric curve. A result of fitting is dubbed a "fit" (noun) and can include the optimized parameter values (sometimes dubbed "fitted parameter values"), the parameterized function incorporating the optimized parameter values (e.g. "fitted line" or "fitted curve"), or the errors of the fitted data points. In some examples, fitting can be aided by visualization of the data points and can be termed "graphical" fitting. To illustrate, visualization of the data points on a graph can elucidate certain features (e.g. clusters of data points, or distinct regions on the graph) which may not be readily apparent in a list of the data points, and which can be used to evaluate the predetermined criterion or obtain the optimized parameter values. Some examples disclosed herein utilize image processing techniques to determine an optimum line from a synthetic image and are considered graphical fitting techniques herein. One such example technique is the Hough transform. The term "polynomial" includes expressions of zeroth or first degree (e.g. constants or straight lines respectively).

A "focused ion beam" ("FIB") is a beam of ions whose focus can be controlled to direct the beam to a spot on a surface, or which can be swept over a sample in a sweep pattern. A FIB can be used for removal of material (e.g. milling), analysis (e.g. imaging), or deposition of material at the incident spot. Some FIBs are used for milling. Commonly, a FIB comprises positive elemental ions, such as Xe+ or Ga+, however these are not requirements. Ion beam species such as Ga+ can be sourced from e.g., a liquid metal ion source (LMIS), while other ion beam species such as Xe+ can be produced in a plasma. A FIB produced with a plasma source can be termed a plasma focused ion beam (PFIB).

The term "imaging" refers to a process for obtaining a two-dimensional representation (dubbed an "image") of a parameter value over a region of interest of a sample. In some examples, the imaged parameter can be reflectivity of an incident particle beam (e.g. by SEM), but this is not a requirement, and visible light or other parameters can also be imaged. In disclosed examples, the image can indicate features such as edges or reference structures on the sample. In further examples, the region of interest can include at least portions of one or more surfaces of the sample.

An "imager" (sometimes, "imaging tool") is an apparatus capable of imaging. In disclosed examples, an SEM can be used as an imager. However, this is not a requirement, and other high-resolution imaging tools such as atomic force microscopes or super-resolution optical microscopes (e.g., using temporal variation or fluorescence techniques) can also be used. An FIB tool can perform imaging, however better spatial resolution can be achieved by SEM or other techniques.

"Image correlation" refers to a value of a metric that indicates similarity between two images, also sometimes dubbed the "similarity score" of the two images. Non-limiting examples of such metrics include cross-correlation, sum of squared differences, mutual information, or normalized mutual information; and further include metrics based on template matching or correlation between two-dimensional histograms of gradients (HoG). As an illustration, an image correlation metric can be calculated as a pixel-wise correlation between two images. As another illustration of the HoG technique, a 1024×1024 image can be divided into 64×64 blocks of size 16×16 pixels each. 63×63 gradients can be calculated between adjacent pairs of blocks in each direction, and the gradients can be binned into a 12×12 HoG. Then, a correlation metric between two images can be calculated as, or based on, bin-wise correlations between the images' respective HoGs. As a further illustration of the template matching approach, a template derived from a first image can be slid across a second image to derive a 2-dimensional position at which the template is best matched in the second image. A correlation metric between the first and second image can be derived based on the correlation between template and second image at the best matching position.

The term "iteration" refers to each of multiple times a given operation or sequence of operations is performed. The repeated sequence of operations is dubbed a "loop". A loop capable of iterating multiple times can sometimes execute just one iteration. An iteration of a loop need not execute all operations in the loop, but can branch, terminate, or exit early, e.g. if a termination condition is met.

A "lamella" is a thin sample to be imaged in a transmission electron microscope (TEM). A lamella can have thickness in a range of 5-200 nm, 8-60 nm, or 10-20 nm.

A "major surface" of a sample is a surface of the sample whose area is not substantially exceeded by any other surface of the sample. For convenience of description, samples are considered to have top and bottom major surfaces, with the bottom surface supported on a stage and the top surface exposed to one or more tools or beams.

A "match" is a logical, qualitative, or quantitative result of a comparison, indicating equality or similarity between the compared entities. Non-limiting examples of a match include: the compared entities being equal, being equal with a predetermined tolerance, or having a correlation above a predetermined threshold. In examples where a given entity (e.g. a current image) is compared with multiple references, a "closest match" can refer to the reference which is most similar to the given entity. A closest match can be one or the multiple references, or can be an interpolation among these references.

A "metric" is a function providing a single value from one or more attribute values, images, or other data. Exemplary metrics derived from multiple attribute values can include a weighted sum of multiple attribute values, or a ratio of two attribute values. A metric for a single attribute value can be the value itself, but this is not a requirement. In some examples, a linear or non-linear transformation can be applied to an attribute value. An exemplary metric derived from two images can be a cross-correlation between the two images. Some metrics of interest herein are closeness metrics, which can be based on images or on attribute values. A metric can be dimensionless or can have units. Some metric values disclosed herein are numerical (with or without units), but this is not a requirement, and other metric values can have e.g. logical or categorical values.

"Milling" is a material removal process over a path that is guided by movement (sometimes termed "sweep") of a milling tool relative to a sample being milled. Milling is a form of etching. Like other etching techniques, a milling operation can expose one or more "cut faces" of a sample by removing material up to and on one side of the cut face. The guided movement of the milling tool, such as a focused ion beam ("FIB"), provides positional control of material removal. Milling can combine spatially controlled and spatially diffuse techniques, for example techniques described as "gas-assisted ion beam milling" or "ion-beam assisted [chemical] etching" in the art. A "milling tool" is an apparatus capable of milling.

A "nanostructure" is a structure having extent between 1 nm and 1 μm in at least two orthogonal directions.

A "notification" is an indication of a status, condition, or measurement. The notification can be provided by an audible or visible annunciator (e.g. on a display), as a message output from one apparatus to an operator or to another apparatus or to an operator, or a message stored in a log.

A "periodic structure" is a collection of features in a sample, or on a surface of the sample, having a repeating pattern. That is, a hypothetical translation of one instance of the pattern in a given direction can result in the instance coinciding with a neighboring instance of the pattern. The structure can be said to have "periodicity" in the given direction, and the distance of translation is dubbed the "period". A structure can have periodicity in multiple directions, with same or different periods in those directions.

A "reference" is a predetermined entity which can be used as a basis for a comparison, e.g. as an aid to monitoring an ongoing procedure on an active sample. In some examples, references can be images ("reference images") taken at respective positions of a reference sample. The images can be images of an exposed face of the reference sample and the respective positions can be denoted "face positions". In other examples, the references can be attribute values associated with features in the reference images, or attribute values determined by other techniques without imaging. The references can be collectively denoted a "reference index". In some examples, the active sample can incorporate a periodic structure, and the active sample itself can be used as the reference sample. That is, one or more periods of such a structure can be used to obtain the references, which can be used subsequently to monitor etching through a different period of the structure. In other examples, the reference sample and the active sample can be distinct, but can incorporate a similar structure, which can be periodic or non-periodic. In some described examples, various references are obtained from a single reference structure, but this is not a requirement. Because structures are congruent and sometimes periodic, references can be obtained partly from one or more locations on the active sample and partly from one or more other samples, in any combination. References can also be obtained by averaging data from multiple samples. In some examples, the successive face positions of the references can be obtained by a same or similar process as that used for the monitored procedure on the active sample, but this is not a requirement. In other examples, distinct processes or different operating conditions can be used. To illustrate, a process configuration used for obtaining the references can provide more accurate spatial control, while a configuration used on the monitored process can provide greater speed.

A "region of interest" (ROI) is a portion of a sample that includes a feature or structure that is the subject of subsequent analysis. An ROI can be defined with respect to a surface of the sample (e.g. a cut face at a target position, or a surface region to be etched to reach the target position) or with respect to a volume (e.g. a volume containing a periodic structure from which one or more lamellas are to be extracted, or a volume containing the target position). The term ROI does not refer to any human interest.

A "rotation" is a change in angular orientation of an object relative to another object or relative to a fixed coordinate system. In some examples, a tool axis (e.g. a view axis or beam axis of a process tool) can be rotated relative to a sample. Rotation can be performed by rotating all or part of the process tool, by steering a beam, by rotating the sample, or by any combination of the above. Rotations can include azimuthal rotations and tilts, singly or in any combination. An "azimuthal rotation" is a rotation about an axis normal to a mounting surface of a stage or a working surface of a sample, or about a central axis of the process tool. A "tilt" is a rotation which changes the relative angular orientation between the axis of azimuthal rotation and the process tool.

A "sample" is a physical object upon which imaging, milling, or other analytic or manufacturing procedures are performed. Common samples can incorporate multi-layer electrical or electronic structures, or other material structures, undergoing manufacture or being prepared for imaging or another analytic procedure. In some examples, a sample can be a semiconductor memory or logic device. An objective of disclosed technologies can be to prepare another sample, such as a lamella for TEM analysis.

A "semiconductor device" is a device incorporating one or more semiconductor regions (e.g. doped or undoped silicon, germanium, III-V semiconductors, or similar materials) configured to perform one or more electronic functions. A semiconductor device can be a finished product, a portion thereof, or a product at an intermediate stage of manufacture. Semiconductor devices commonly include other materials to provide insulation or conducting paths between semiconductor regions. Non-limiting examples of semiconductor devices include transistors, memory cells, and some optoelectronic devices. Memory interface circuits can include both conductive wiring and logic gates.

A "stage" is an apparatus to which a sample can be attached and having actuators for adjusting a position or orientation of the sample. A "multi-axis stage" has multiple degrees of freedom, offering spatial adjustment of a sample in varying combinations of translation or rotation. A "rotatable stage" can be azimuthally rotated about an axis normal to a surface of the stage (dubbed "mounting surface") upon which the sample is mounted. Some rotatable stages can be tilted about one or two axes in, or parallel to, the plane of the mounting surface.

A "target position" (or, simply "target") is a coordinate or location within a sample at which a cut face is desired, e.g. for a TEM lamella. A target position can be based on a coordinate or structural feature of the sample. A target position can indicate a plane, a line, or a point, and can encompass a predetermined one-dimensional, two-dimensional, or three-dimensional spatial extent (dubbed "tolerance range") about such plane, line, or point. That is, a cut face or other position within the tolerance range can be said to be at the target position, and an etching procedure can then be said to have "reached" the target.

A "termination condition" is a criterion under which an iterative process ceases to perform further iterations.

The terms "top," "bottom," "up," "down," "above," "below," "horizontal," "vertical," and the like are used for convenience, with respect to a common configuration in which an exposed major surface of a horizontal sample has an outward normal directed upward, e.g. the sample is accessible to process tools from above. One of ordinary skill will understand from this disclosure that a choice of actual orientation can be varied without departing from the scope of the disclosed technologies.

Example Samples

FIG. 1 shows views 101-103 of a first example sample upon which the disclosed technologies can be performed. Views 101-103 are plan, elevation, and profile views of sample 150. Axes 111-113 are illustrated alongside respective views 101-103 to facilitate description.

As illustrated, slot 156 is being milled in sample 150, with milling proceeding in the +Y direction. An objective is to have cut face 148 reach target position 144. Surfaces 152, 154 are a major surface of sample 150 and a bottom surface of slot 156 respectively. As described further herein, examples of the disclosed technology enable distance D (146) to be determined. Target position 144 can be defined based on some structure features present in sample 150. The structure can be periodic in the Y direction, and target 144 can be one of several equivalent planes having extent parallel to the XZ plane. Further examples of the disclosed technologies can control milling, based on one or more measurements of distance D (146), so as to reach target position 144 to within a predetermined tolerance.

Also illustrated in FIG. 1, bottom surface 158 of sample 150 can be tilted relative to top surface 152. As a result the Z extent of the sample can vary as milling progresses in the +Y direction, which can affect milling performance. To compensate for such varying performance, control parameters for a milling tool (similar to 320) can be adjusted as milling progresses.

Figure 2:
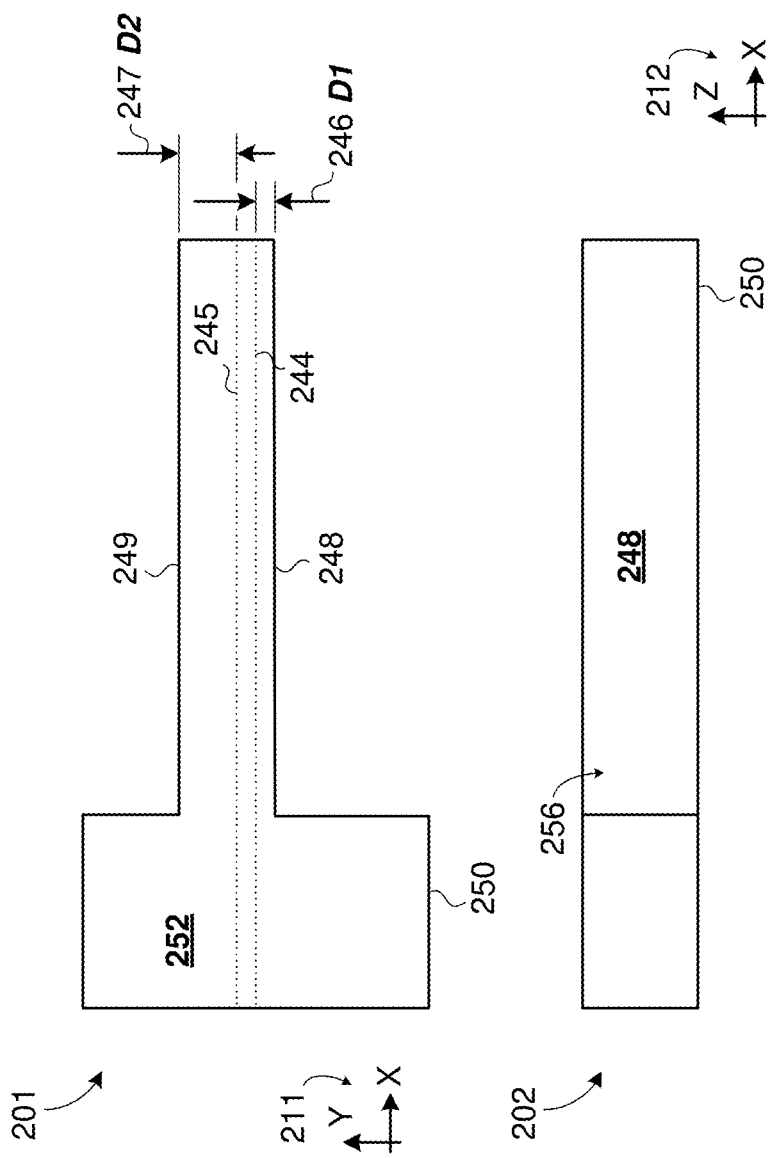
FIG. 2 shows views of a second example sample upon which the disclosed technologies can be performed.

FIG. 2 shows views 201-202 of a second example sample upon which the disclosed technologies can be performed. Views 201-202 are plan and elevation views of sample 250, with respective coordinate axes indicated as insets 211-212.

Front slot 256 milled in sample 250, below top major surface 252, can be generally similar to slot 156 described for FIG. 1. However, unlike slot 156, slot 256 extends to the extent of sample 250 in the −Z and +X directions. That is, slot 256 is milled through the Z height of sample 250, leaving no bottom surface. Slot 256 is also milled through the right-hand (+X) end of sample 250, leaving slot 256 with no right-hand wall. As illustrated, cut face 248 is at a first distance D1 246 from front target position 244.

Sample 250 also has a back slot, which has a back cut face 249. Back target position 245 is also shown, at a distance D2 247 from current cut face 249. When both front and back cut faces 248, 249 have reached respective target positions 244, 245, a thin lamella will be formed between cut faces 248, 249, and can be detached from sample 250, for example by pattern milling around the circumference of the lamella. In other examples, the thin lamella can be formed, as shown, after sample 250 has been mounted on a lamella carrier, and no detachment is required. That is, the lamella can be formed already attached to a lamella carrier, and in a suitable orientation for TEM imaging. Then, the lamella carrier can be transported to the TEM and one or more lamellas mounted on the lamella carrier can be imaged directly.

In some examples, cut faces 248, 249 can be milled successively. That is, milling of front slot 256 can proceed until front target position 256 has been reached. Then, sample 250 can be rotated to provide milling and imaging tools to operate on back slot 257. In variations, milling and imaging tools can be rotated about a stationary sample 250. In further variations, milling can be performed in phases. For example, coarse milling of front slot 256 can be followed by coarse milling of back slot 257, fine milling of back slot 257, and finally fine milling of front slot 256. Still further, cut faces 248, 249 can be milled concurrently, e.g. in a tool having two mills and two imagers.

Example System

Figure 3:
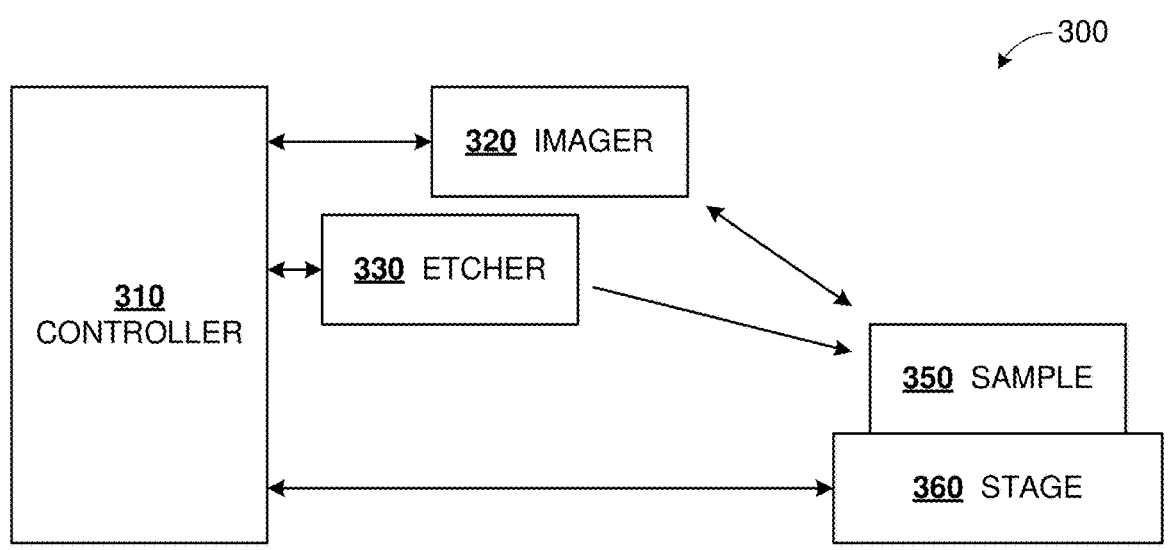
FIG. 3 is a diagram of an example system with which the disclosed technologies can be implemented.

FIG. 3 is a diagram 300 of an example system with which the disclosed technologies can be implemented. In communication with controller 310, imager 320, and etcher 330 can perform respective operations on sample 350. Sample 350 can be mounted on stage 360. In some examples, imager 320, etcher 330, sample 350, and stage 360 can be part of the environment for an apparatus embodied in controller 310 while, in other examples, one or more of imager 320, etcher 330, and stage 360 can be included as part of an innovative apparatus. Sample 350 can be similar to samples 150, 250, or other samples described herein. While the description in this section sometimes describes 350 as an active sample, the systems and apparatuses are not so limited, and can also be used to process a reference sample as described in this disclosure.

An example apparatus can include imager 320 and controller 310. Imager 320 can be configured to generate an image of a cut face (similar to cut face 148 of FIG. 1). In some examples, imager 320 can be an SEM. Controller 310 can be configured to acquire an image from the imager, compare the image with one or more references, determine a distance value between the cut face and a target position, and store the distance value. In varying examples, the reference images can be images at a sequence of face positions, or values of feature attributes extracted from such reference images.

Numerous extensions and variations of this apparatus can be implemented within the scope of the disclosed technologies.

In some examples, the apparatus can include etcher 330, which can variously incorporate an ion beam mill, a plasma etcher, a laser, a gas-assist subsystem for gas-assisted ion beam milling, or another type of etching tool. Controller 310 can be configured to cause etcher 330 to etch sample 350 to a depth beyond the current cut face, wherein the additional depth of etch equals the distance value to within a tolerance range. In further examples, controller 310 can cause etcher 330 to iteratively etch the cut face. As the cut face is progressively etched, the controller can repeat the acquiring, comparing, and determining operations after each iteration to obtain successive distance values to the target position.

Numerous techniques can be applied for the comparing and determining operations. In some examples, the image of the cut face at a current position can be a most recent in a succession of cut face images (at respective positions) obtained as the sample is etched to the cut face at the current position. The determining can additionally be based upon comparison between preceding cut face images and the references.

The references can be reference images having predetermined respective distances to a reference target position. The comparing can include computing respective image correlations between the acquired image and the reference images. A given reference image can be found to have highest correlation with the acquired image of the current cut face.

In some examples, the distance value can be determined based on the reference distance of the given reference image. To illustrate, the reference images can be acquired on a reference sample distinct from active sample 350, but incorporating a similar structure. That is, the reference target position can have a same relationship to features in the reference sample as the present target position has to features in active sample 350. Accordingly, if the given image has a distance of 50 nm from the reference target position, then the distance value can also be set to 50 nm, based on congruence between the structures in the reference sample and in active sample 350.

In other examples, fitting can be used. Controller 310 can be configured to perform a one-dimensional fit of three or more of the computed image correlations as a function of the respective reference distances, and can determine the distance value corresponding to a maximum value of the fitted function. To illustrate, if the given reference image is #7, then the correlations with reference images #6, #7, and #8 can be fitted to a parabola. The peak position of the parabola can be used to set the distance value. Illustratively, if these reference images have respective distances 60, 70, 80 nm to the reference target position, which corresponds to the present target position on sample 350, and the resulting fitted parabola has a peak at reference distance of 68 nm, then the distance value can be set correspondingly.

In further examples, two-dimensional fitting can be used. Image processing techniques can be used. Image correlations between multiple cut face positions leading up to the current cut face and multiple reference images can be used as pixel intensities of a synthesized image. To illustrate, a high pixel intensity can correspond to a high value of image correlation, and a bright band can be formed in the synthesized image as the cut face is etched. Fitting can be applied to the bright band to obtain a fitted relationship between reference distances and the multiple cut face positions on sample 350. Evaluation of this fitted relationship at the current cut face can be used to determine the reference distance and thereby the distance value. To illustrate, the fitted relationship can map the current cut face to a reference distance of 66 nm. If the reference target position is offset from the present target value (in relation to congruent structures on the reference sample and sample 350) by 10 nm, then the distance value corresponding to the reference distance of 66 nm can be D=66 nm±10 nm=76 nm or 56 nm, depending on the direction of the offset between target positions.

In other examples, the references can be reference values of attributes of features, evaluated at respective face positions on a reference sample, each face position having a respective reference distance to a reference target position. To illustrate, the features can be in the form of metallization, doping regions, vias, fiducials, markings, or other discernible features. Attributes can be size, position, distance from another feature, curvature, orientation, pixel intensity of the feature in an image, or a derived quantity such as a ratio of two lengths. Then a comparison can be made between values of one or more corresponding feature attributes in the acquired image, at a current cut face position, and the reference values. That is, controller 310 can be configured to identify the corresponding features in the acquired image, determining corresponding attribute values of these features, and compare these attribute values with the reference values. In some examples, only one feature attribute is evaluated in the acquired image while, in other examples, multiple feature attributes can be evaluated. Where a single feature attribute is used for each image or reference position, the comparing can result in a difference (or, absolute value of the difference) between the reference value and the corresponding attribute value from the acquired image at the current cut face position. Where multiple feature attribute values are used for each image or reference position, the multiple differences (one for each feature attribute) can be combined to determine a closeness metric having a single value.

As described herein for image correlations, examples using feature attributes or a closeness metric can also determine the distance value in diverse ways. As a result of the comparing operation, a given face position can be found (among the references) to have a closest match with feature attribute(s) of the acquired image. In some examples, the distance value can be determined directly based on the reference distance of the given face position, and based on the congruence between structures in a reference sample and structures in active sample 350.

In other examples, one-dimensional fitting can be used. Controller 310 can be configured to fit results of the comparing operation (e.g. differences or closeness metric values) as a function of the reference distances, and the distance value can be determined corresponding to an optimum value of the fitted function. In varying examples, the optimum value can be zero (e.g. signifying zero difference between the compared attribute values), a minimum (e.g. a closeness metric which is the absolute value of the product of two differences), or a maximum (e.g. a closeness metric which evaluates a correlation or similarity score between the acquired image and a reference).

In further examples, two-dimensional fitting can be used. Comparison results between multiple cut face positions leading up to the current cut face and multiple reference images can be used as pixel intensities of a synthesized image. To illustrate, a high pixel intensity can correspond to a close match, and a bright band can be formed in the synthesized image as the cut face is etched. Fitting can be applied to the bright band to obtain a fitted relationship between reference distances and the multiple cut face positions on sample 350. Evaluation of this fitted relationship at the current cut face can be used to determine the reference distance and thereby the distance value from the current cut face to the target plane in the active sample.

In examples using two-dimensional fitting, the fitted relationship can be a straight line, but this is not a requirement and, in other examples, curved or nonlinear fitted relationships can be used. Two-dimensional fits can be performed graphically, or using image processing techniques, such as a Hough transform or a variant thereof. In some examples, an extension of the Hough transform using a parabolic fit can be used.

The controller can be configured to perform similar operations on both a front cut face and a back cut face, thereby enabling lamella faces to be accurately approached from both sides. For example, the controller can be configured to rotate stage 360 after operations on a front cut face of active sample 350, in order to perform similar operations on a back cut face of active sample 350.

In some examples, active sample 350 can have multiple regions of interest with congruent structures, and one of these regions can be utilized for the references while one or more other regions can be utilized for lamella preparation. With reference to FIG. 2, structures in sample 250 can be periodic in the Y direction. One period of such a structure can be sacrificed to obtain reference data, while another one or more periods can be utilized to prepare respective lamella(s). In other examples, structures in sample 250 can be periodic in the X direction, and the reference site and the lamella preparation site can be offset from each other in the X direction.

First Example Method

Figure 4:
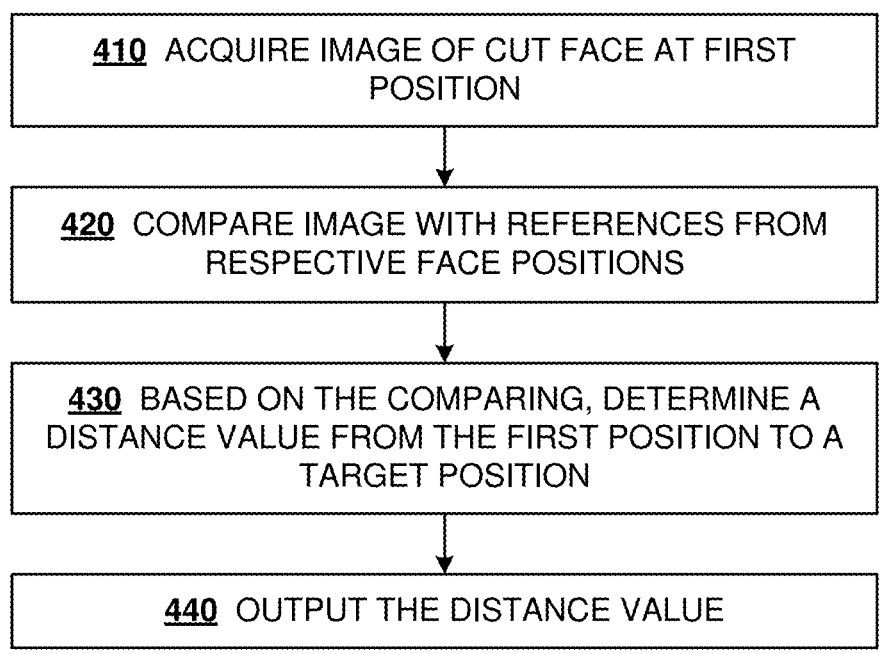
FIG. 4 is a flowchart of a first example method for determining a distance between a cut face and a target position, according to the disclosed technologies.

FIG. 4 is a flowchart 400 of a first example method for determining a distance between a cut face and a target position. In this method an image of a cut face is used to determine a distance from the cut face to a target position. The method of FIG. 4 can be performed by an apparatus comprising a controller and an imager similar to 310 and 330 of FIG. 3.

At process block 410, an image of a cut face, at a current position on an active sample, can be acquired. The cut face can be similar to cut face 148 of FIG. 1. At block 420, the image can be compared with predetermined references from respective reference face positions. (In some examples, the reference face positions and the imaged cut face can be on different samples, e.g. a reference sample and the active sample while, in other examples, the reference positions and the imaged cut face can be at different regions of the active sample.) A distance value, from the current position to a target position within the active sample, can be determined at block 430 based on results of the comparing at block 420. At block 440, the distance value can be output. For example, the distance value can be output to a storage medium, to a display, or transmitted over a network to another apparatus.

Numerous extensions and variations of this method can be implemented within the scope of the disclosed technologies. In some examples, the sample can be etched to the current position prior to the image acquisition of block 410.

The comparing at block 420 can include comparing respective values of a closeness metric between the acquired image and each of the predetermined references. In some examples, the closeness metric can be based on an image similarity score between the acquired image and the each predetermined reference. In further examples, the closeness metric can be based on corresponding first and second features in the reference and the acquired image. That is the closeness metric can be a difference between (i) a first value of a first attribute of the first feature for the predetermined reference, and (ii) a second value of the first attribute of the second feature extracted from the image.

In some examples, the distance value can be determined based on the reference distance of a given reference having an optimum value among the closeness metric values while, in other examples, the distance value can be determined based on an optimum value of a fitted function obtained by performing a one-dimensional fit of three or more of the closeness metric values as a function of the respective reference face positions. In further examples, the imaged cut face at the current position can be preceded by one or more preceding images at respective preceding positions on the active sample. The determining can be based on comparisons for the current position and further on comparisons between the preceding images and the predetermined references. For example, two-dimensional fitting can be performed on a plurality of metric values spanning multiple positions of the cut face (including the closeness metric values computed for the current position) to obtain a fitted relationship between the reference face positions and the multiple positions of the cut face. The distance value can be determined based on a value of the fitted relationship at the current position.

Based on the determined distance value indicating that the current position is within a tolerance range about the target position, a lamella can be detached from the active sample.

In further examples, the cut face imaged at block 410 can be a front cut face, and similar operations can be performed on a back cut face similar to 249 of FIG. 2. Particularly, an image of the back cut face can be used to determine a second distance value between the back cut face and a back target position.

Etching can be performed before block 410 or after block 430, and can be performed by any of a variety of techniques, singly or in combination, including ion beam milling, plasma etching, laser etching, or gas-assisted ion beam milling. In some examples different etching techniques can be used for coarse and fine etching. Etching can increase etch depth in a first direction (e.g. the Y direction in FIG. 1). In some examples the active sample can incorporate a structure having periodicity in one or both of the first direction (Y) or a second transverse direction (e.g. X direction of FIG. 1 or FIG. 6).

The active sample can incorporate a one dimensional, two-dimensional, or three-dimensional array of repeating devices, which can include semiconductor devices, opto- electronic devices, or nanostructures. Non-limiting examples of such semiconductor devices can include memory cells, memory interface circuits, or transistors. An array of repeating devices does not preclude the presence of other devices interspersed among the repeating devices.

Second Example Method

Figure 5:
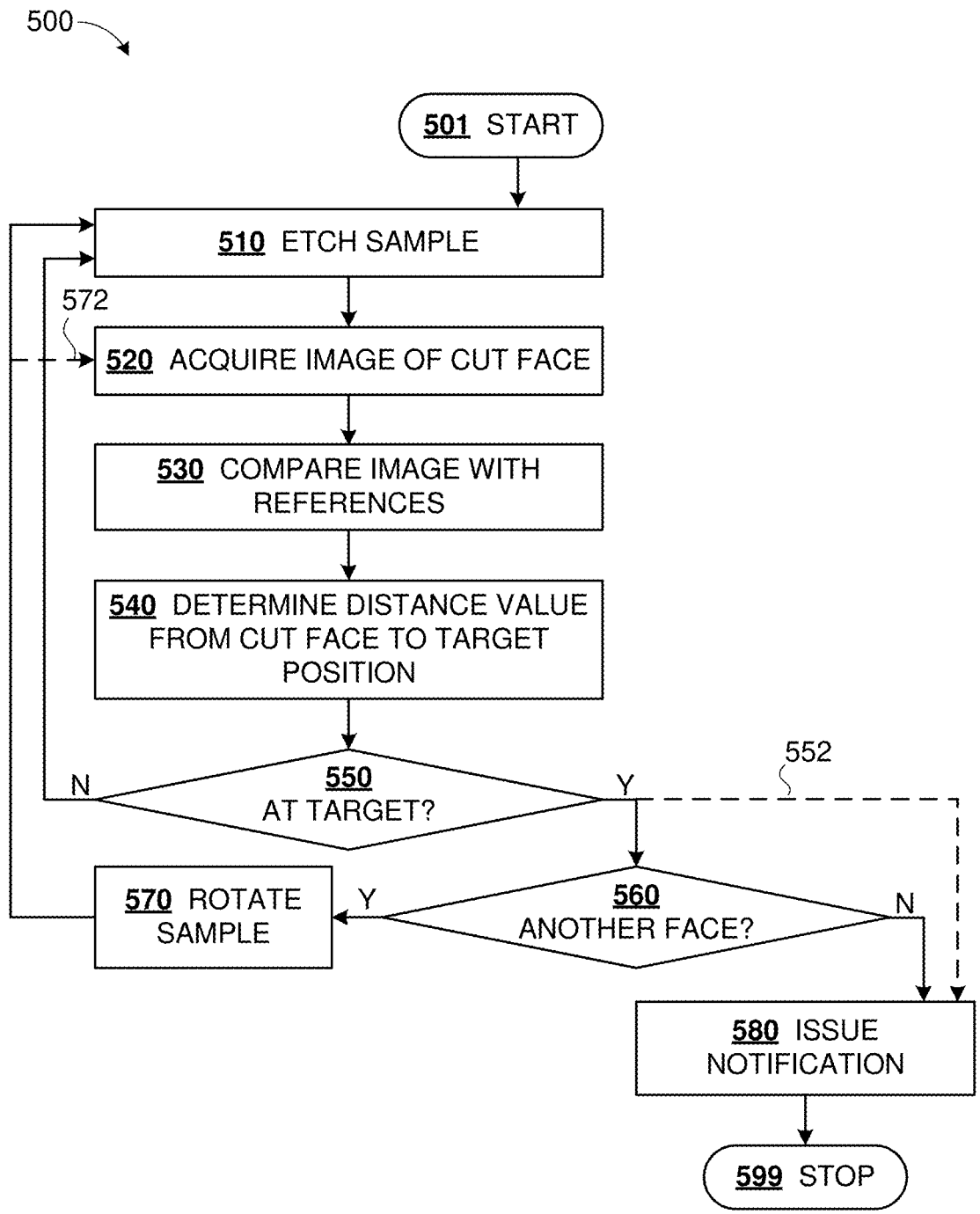
FIG. 5 is a flowchart of a second example method for iterative endpointing at a desired target position, according to the disclosed technologies.

FIG. 5 is a flowchart 500 of a second example method for iterative endpointing at a desired target position. In this method, an active sample is etched iteratively. At each iteration, the active sample is compared with references and a current value of distance to a target position is determined.

From start block 501, the method enters an iterative loop at process block 510, where the active sample can be etched. The etching can be performed by an ion mill to reach a cut face at a current position. Following the etching, the cut face can be imaged at block 520. The imaging can be performed by an SEM. At process block 530, the image of the cut face can be compared with predetermined references having reference face positions on a reference sample. As described herein, the references can be images of a sequence of reference slices, or can be attribute values of features extracted from such images. At block 540, a distance value can be determined which indicates a separation between the cut face and the next target position in the active sample. With this distance value, a determination can be made at decision block 550 whether the target has been reached, and the method can branch accordingly. If the target has not been reached, the method can follow the N branch from block 550 to block 510 for a next iteration and further etching. Alternatively, if the target has been reached, the method can follow the Y branch from block 550 to another decision block 560, which can check if another face of the sample requires processing. If no other face needs processing, the method can follow the N branch from block 560 to process block 580, where a notification can be issued indicating that the target position has been reached and the method is complete, following which the method can terminate at stop block 599. However, if another face remains to be processed, the method can follow the Y branch from block 560 to process block 570, where the sample is rotated relative to the etching and/or imaging tools. For example, a stage on which the sample is mounted can be rotated. Then, the method can proceed to block 510 to perform initial etching on the next face.

Numerous extensions and variations of this method can be implemented within the scope of the disclosed technologies, including those described in context of FIG. 4.

In some examples, the method can be used to process just one face of a sample, and block 560 can be omitted. In such case, the Y branch from block 550 can proceed directly to block 580, as indicated by dashed line 552. In further examples, operations on a face can omit the initial etch at block 510, and operations can start with a measurement on an existing cut face. That is, the method can proceed from block 570 to block 520, as indicated by dashed line 572.

Process blocks 510, 520 can be performed on a sample dubbed an active sample. In some examples the method can be extended to include acquisition of a series of reference images on a reference sample prior to start block 501. The reference images can be acquired at respective reference face positions on the reference sample. In some examples, the comparing at block 530 can include computing respective similarity scores between the reference images and the image acquired at block 520. In other examples, the method can further include extracting first features from the reference images and determining reference values of attributes in these images. Then, at block 530, one or more second features can be extracted from the image acquired at block 520, corresponding attribute value(s) can be determined for the second features, and the corresponding attribute value(s) can be compared with the reference values.

In some examples, the distance value can include a numerical distance (e.g. 23 nm). In other examples, the distance value can include a logical variable indicating whether or not the cut face has reached the target position. In further examples, the distance value can include a categorical variable, e.g. indicating whether a next etch step should be a coarse etch step because the remaining distance is above a predetermined threshold, a fine etch step because the remaining distance is below the threshold, or no etch step because the cut face is within a tolerance zone about the target position. Where etching is continued, one or more etch control parameters can be adjusted prior to continued etching. As an illustration, a voltage of an ion beam can be reduced from around 30 kV used for faster coarse milling to about 5 kV used for finer milling and a smoother milled surface.

Example Semiconductor Sample

Figure 6:
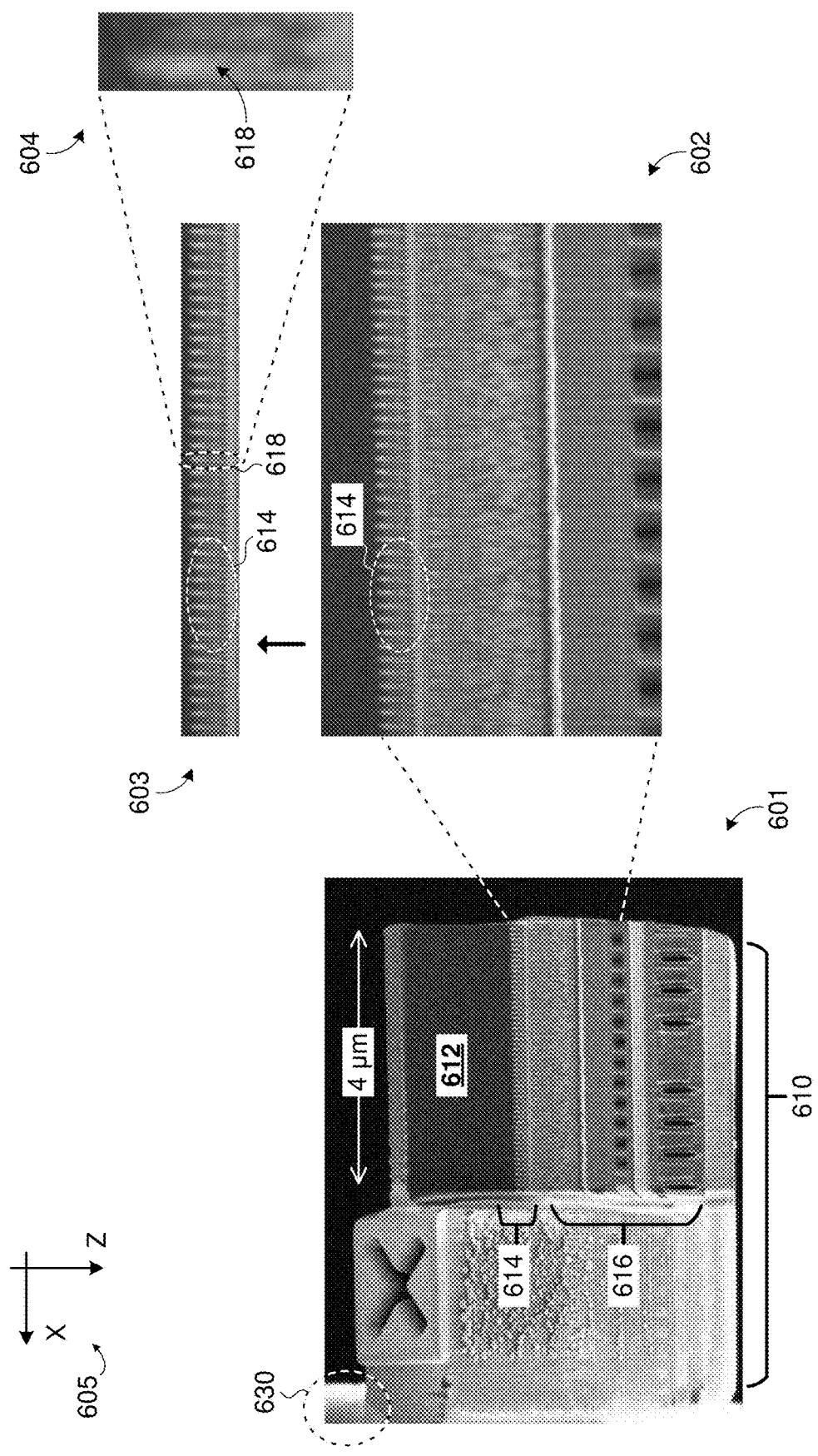
FIG. 6 shows image views of an example semiconductor sample upon which the disclosed technologies can be implemented.

FIG. 6 shows image views 601-604 of an example semiconductor sample 610. Sample 610 is part of a memory device, and views 601-604 depict progressively smaller portions of sample 610 at a same point in time. X, Z coordinate axes 605 are also shown, with a Y axis (not shown) being oriented orthogonal to the X, Y axes, pointing away from a reader and into the plane of FIG. 6.

View 601 shows an enlarged view of sample 610. Milling in the Y direction has been performed on the right-hand portion of sample 610, over an X extent of about 4 μm. The left-hand portion of sample 610 has not been milled and can be used to support the milled portion. The milled portion of sample 610 reveals a structure of layers oriented parallel to the XY plane. In the direction of increasing Z coordinate, substrate 612 is followed by semiconductor device layer 614 and multiple layers of metallization 616. In this example, sample 610 is mounted on a lamella carrier 630, a portion of which is visible in view 601.

View 602 shows a region of interest for lamella extraction, which includes semiconductor layer 614. View 603 is substantially restricted to semiconductor layer 614. In the XZ plane shown, semiconductor layer 614 can be seen to have a periodic array of semiconductor devices arrayed in the X direction. As described further herein, semiconductor layer 614 may also have periodicity in the Y direction. Finally, view 604 is zoomed in on one particular semiconductor device 618 in layer 614. Device 618 can be a portion of a transistor within a memory cell.

Some examples of the disclosed technologies can be used to form a lamella having XZ extent comparable to that of view 603 and a thickness in the Y direction. One or both XZ faces of the lamella can be milled to obtain a thickness suitable for TEM analysis. Then, the lamella can be detached from sample 610 and introduced into a sample chamber of a TEM, and TEM analysis can be performed on included devices such as device 618.

Example Semiconductor Slices

Figure 7:
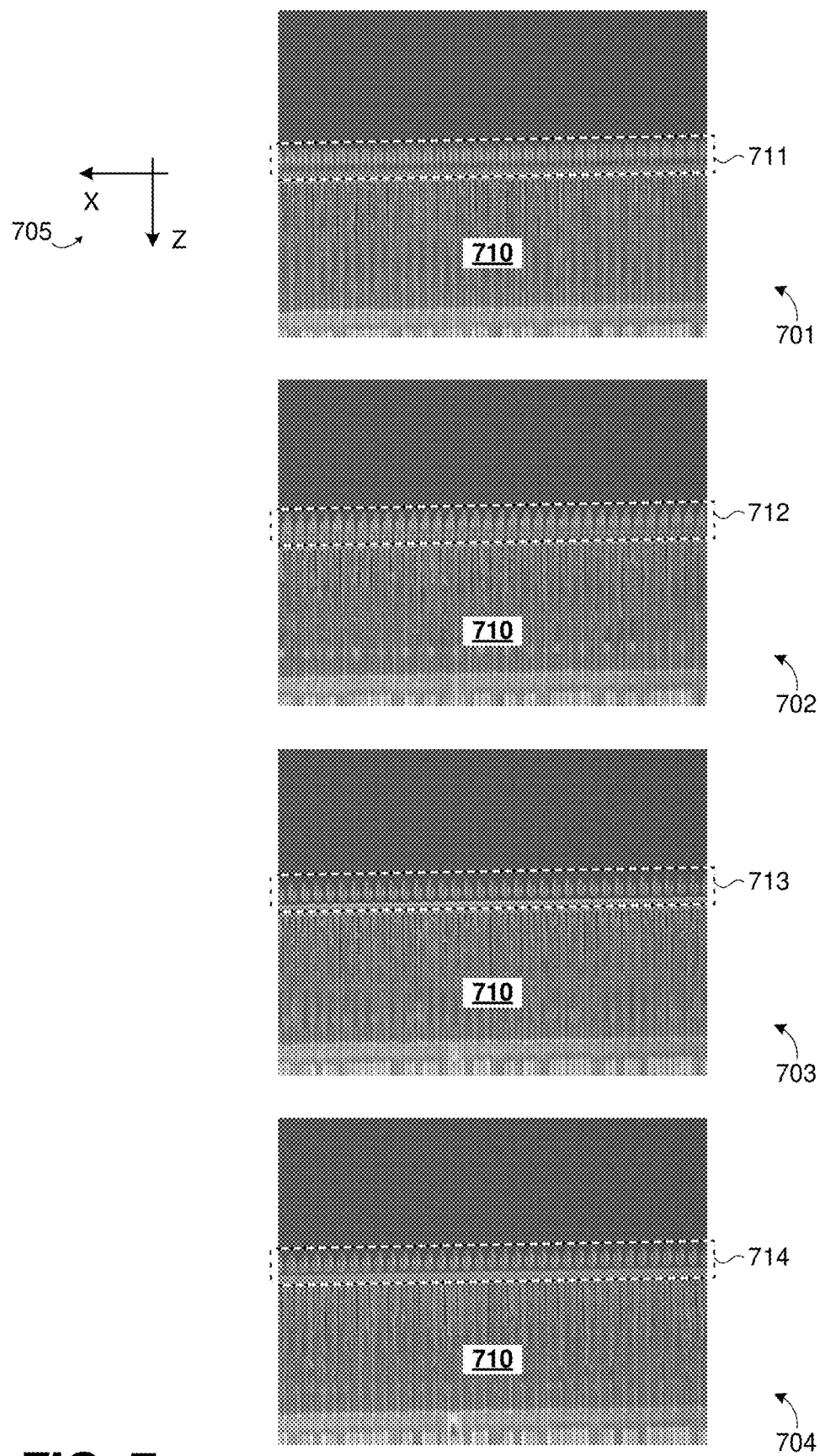
FIG. 7 shows progressive cut face images of another example sample to illustrate features of the disclosed technologies.

FIG. 7 shows progressive cut face images 701-704 as sample 710 is milled. X, Z coordinate axes 705 are oriented similarly to FIG. 6, with a Y axis (not shown) oriented pointing into the plane of FIG. 7. Views 701-704 are SEM images of a cut face at successive face positions, as sample 710 was milled in the Y direction.

While sample 710 is different from sample 610, the general structure is similar to that of view 602, with a semiconductor layer shown within dashed outlines 711-714. In the illustrated example, sample 710 was milled about 20 nm in the Y direction between each successive pair of views 701-704. While each view 701-704 is generally similar, some variation in the appearance of semiconductor devices 711-714 can be seen upon close examination. Examples of the disclosed technologies can utilize this variation to ascertain a Y coordinate of a current cut face between milling iterations, thereby to accurately reach a target position of the cut face. That is, examples of the disclosed technology can be used to mill sample 710 to a requisite lamella thickness. A lamella can be extracted and devices within the lamella can be analyzed using a TEM.

Training Example

Figure 8:
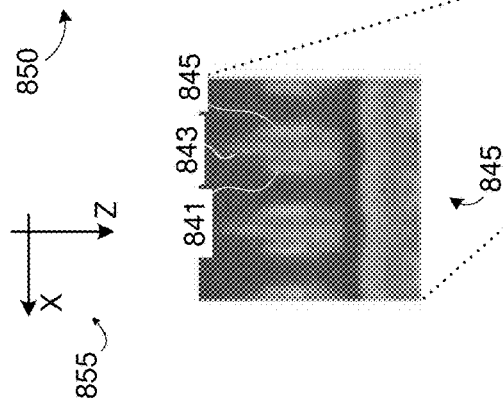
FIG. 8 shows a sequence of example reference images which can be used with the disclosed technologies.
Figure 8:
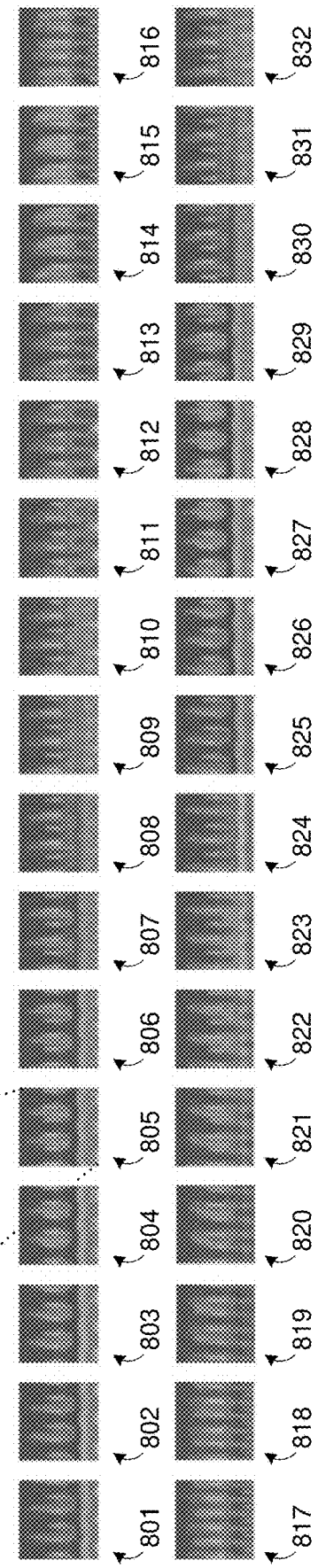

FIG. 8 shows a sequence 801-832 of reference images which can be used to build a reference index in a training phase. X, Z coordinate axes 855 are oriented similarly to FIG. 6, with orientation of a Y axis (not shown) pointing into the plane of FIG. 8. Images 801-832 are images of a cut face taken at successive depths on one sample, as the sample is etched in the Y direction. These successive cut face positions can be referred to as slices. Between one slice and the next, etching can be performed to increase the etch depth. Structures in the instant sample are periodic in the X and Y directions.

Inset 845 is a magnified view of reference image 805. A repeating semiconductor structure is seen, having three features 841, 843, 845. Feature 843 is positioned approximately midway between features 841, 845. Similar features can be seen in images 802-807. Whereas in images 802-803 a middle feature similar to 843 is skewed to the left, the corresponding feature in images 806-807 is skewed to the right. Examination of the remaining images shows continued evolution of the image as cut face depth increases until eventually image 828 appears substantially similar to 805.

The reference images 801-832 can be used to build a reference index in an embodiment of the disclosed technologies. With the reference index, a current Y position of a cut face can be ascertained based on an image of the current cut face and, optionally, images of cut faces at one or more preceding Y positions.

A specific Y position in the repeating reference images can be designated as a reference target position, and subsequent etching on a different active sample can seek to reach a corresponding target position in that sample. Particularly, the reference target position in the reference sample and the corresponding target position in the active sample can have matching cut face images. To illustrate, if image 805 is at the reference target position, then an image of the cut face at the corresponding target position in the active sample can be more similar to image 805 than to images 801-804 or to images 806-827.

In some examples, the Y period of the sample structures is known beforehand. Then, the periodicity of reference images 801-832 can be used to calibrate the etching procedure. To illustrate, if the Y period is known to be 80.5 nm, then the 23 image period (from reference image 805 to reference image 828) can be used to determine that the slice spacing is 80.5/23=3.5 nm.

In other examples, the slice spacing in the Y direction can be known beforehand, e.g. based on a calibrated etch procedure, and can be used as a ruler or scale. A repeating pattern in the reference images can be combined with the known Y slice thickness to establish or confirm the Y period of the sample structures. In either case, the Y positions of each slice 801-832 can be determined relative to a periodic sample structure.

Turning to table 850, a distance value is shown for each slice 801-832. However, rather than indicate an absolute Y coordinate, the distance listed is the distance to the next reference target position. To illustrate, slice 805, which is the designated reference target position, is listed as having a distance of 0.0 nm to itself, or alternatively a distance of 80.5 nm to the next reference target position at image 828. Preceding reference images 804, 803 are successively 3.5 nm and 7.0 nm before the target position at image 805, while following reference images 806, 807 are at distances 77.0 nm and 73.5 nm from the next reference target position at image 828. The remaining distances listed in table 850 can be determined similarly.

Once the references (e.g. images 801-832) are established, different techniques can be used to match a cut face image on the active sample with the references. In some examples, an image correlation can be calculated and used to compare the cut face image from the active sample with a given reference image 801-832. In these examples, the references used for comparison can be the reference images themselves.

In other examples, attributes of features (e.g. 841, 843, 845) can be measured and used for comparison. Non-limiting examples of such attributes can include: the height (in Z direction) of feature 843; the ratio of (i) the X direction separation between features 841, 843 to (ii) the X direction separation between features 843, 845; or the contrast ratio between features 841, 843 and the gap between them.

Comparison Example

Figure 9:
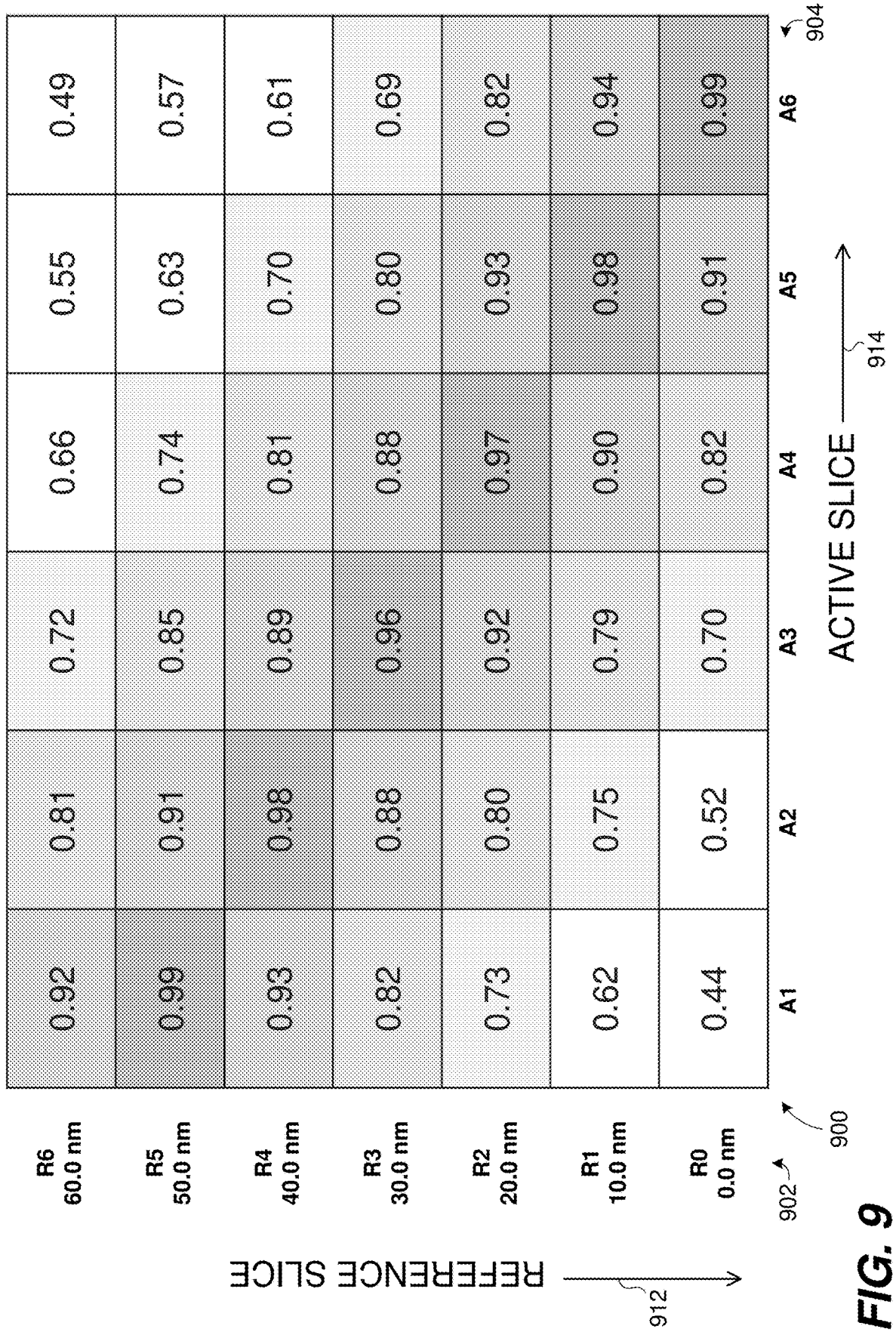
FIG. 9 is a chart illustrating comparisons between active and reference slices according to an example of the disclosed technologies.

FIG. 9 is a chart 900 illustrating comparisons between active images and reference images. Row labels 902 denote reference images R0 through R6 for which distances to a next reference target position are also indicated. The distances to a next reference target position can be determined as discussed in context of FIG. 8 herein. Arrow 912 indicates increasing etch depth among the reference slices R0-R6. As expected, increasing cut depth leads to decreasing distance to a next reference target position. Column labels 904 denote images of active slices A1-A6. Arrow 914 indicates increasing etch depth among the active slices A1-A6.

Each cell in table 900 corresponds to an image correlation between the active slice of the corresponding column and the reference slice of the corresponding row. Thus, the bottom left cell indicates that the image correlation between the cut face image of slice A1 and the reference image of slice R0 is 0.44, which is a relatively low value.

The disclosed technologies provide multiple techniques for determining distance-to-target for a current active slice. To illustrate, consider the image correlations in the column for A4, at a time when the active sample has been etched to slice A4. At this time, etching has passed through A1-A3 and the various image correlations in their respective columns are also known. However, slices A5 and A6 are in the future, and the correlation values in these columns are yet to be determined.

In a first technique, the correlation values in column A4 can be compared among themselves to determine that the correlation between active slice A4 and reference slice R2 is greater than for any other reference slice. Accordingly, R2 has the optimum value of closeness metric for slice A4. In the first technique, the distance between A4 and the target position in the active sample can be set directly to 20.0 nm, which is the reference target distance of slice R2. That is, the first technique selects the optimum reference slice from among a finite set of comparisons, and applies the target distance of the optimum reference slice directly, with no interpolation or fitting.

In a second technique, the correlation value in column A4 can be fitted to a function (e.g. a parabola) to determine the reference target distance having the optimum (highest) correlation value. To illustrate, with the values shown, the peak of a fitted function can lie between R1 and R2, at 19.0 nm. Then, the distance between A4 and the target position in the active sample can be set to 19.0 nm. By using additional information from neighboring samples to perform a one-dimensional fit, the second technique can, in some examples, achieve greater accuracy and finer resolution as compared to the first technique.

In a third technique, additional information from preceding active slices can also be used to reduce noise and achieve still better accuracy. Image processing techniques, examples of which are described further herein, can be used to evaluate a straight line passing through the dark shaded cells to provide a balanced weight of correlation values on either side of the line. Whereas the second technique can be sensitive to the precise values in the R1, R2, or R3 cells of the A4 column, the two-dimensional fit used in the third technique is less sensitive to noise or other errors in individual cells.

Although the illustration of FIG. 9 has been described with reference to image correlation, the first, second, or third techniques can be similarly applied to values of any closeness metric computed between one or more active slices and multiple reference slices.

Example Distance Determination

Figure 10:
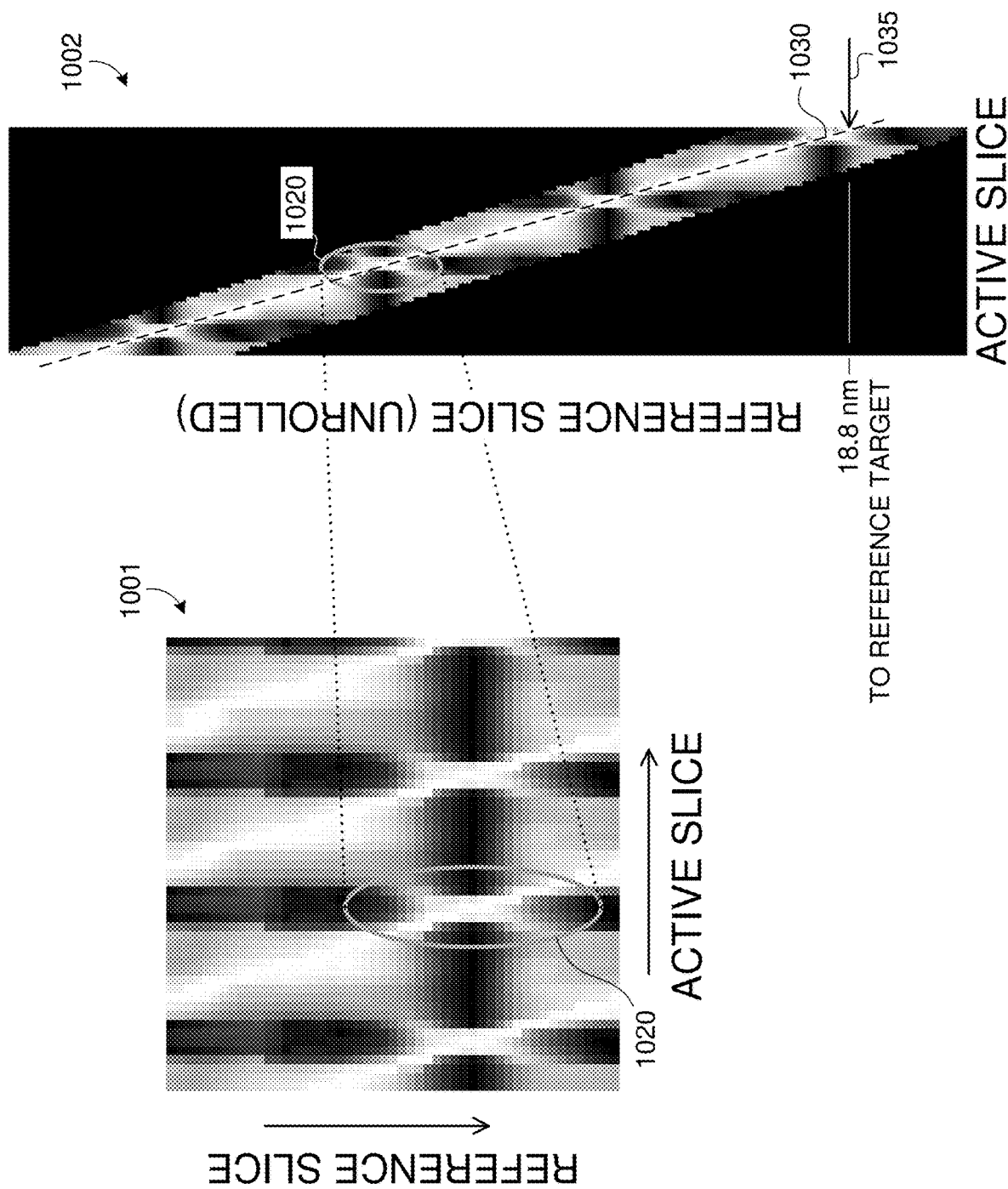
FIG. 10 shows synthesized images with which two-dimensional fitting can be performed according to an example of the disclosed technologies.

FIG. 10 shows synthesized images 1001-1002 with which two-dimensional fitting can be performed. Image 1001 can be similar to chart 900. That is, each pixel of image 900, at a given column and a given row, can have an intensity based on a closeness metric value between an active slice corresponding to the given column and a reference slice corresponding to the given row. As illustrated, close matches (e.g. high values of image correlation) are shown bright (light gray or white), while poor matches (e.g. low values of image correlation) are shown dark (dark gray or black). Image 1001 contains approximately one period of reference slices and about three periods of active slices. That is, the reference sample is finely sliced with about 45 slices per period, while the active sample is more coarsely sliced, with about 15 slices per period. However, the structures in the reference sample and the active sample are congruent to within manufacturing tolerances. For convenience of illustration. As for FIG. 9, arrows alongside image 1001 indicate directions of increasing etch depth.

Image 1001 can be preprocessed to obtain image 1002. In examples, the leftmost column of image 1001 can be left in place, the second column can have its top three pixels shifted by one period to the bottom of the second column, the third column can have its top six pixels shifted by one period to the bottom of the third column, and so forth. Thereby, after one period of active slices, the most recently preprocessed column has been shifted downward by one period of reference slices; after two periods of active slices, the most recently preprocessed column has been shifted downward by two period of reference slices; and so forth. Because the reference sample and active sample structures are congruent and periodic, pixel values can also be periodic, and shifting pixels by integer multiples of the structure period maintains correctness of the closeness metric values. By such a shifting procedure, the pixels adopt the form of a diagonal band, which is shown on a black background in image 1002. Because most pixels in adjacent columns of 1001 retain their neighboring pixels before and after preprocessing, local regions such as 1020 can be retained intact from image 1001 to image 1002. This preprocessing operation can be dubbed unrolling of the reference slices, and the pixels of image 1002 can be considered arranged according to columns which are the original active slices and rows which are unrolled reference slices.

Thereafter, a two-dimensional fit can be performed on image 1002 to determine an optimum line 1030. Various criteria can be used, optimization of which results in line 1030. Non-limiting examples of such criteria include maximizing pixel intensity along line 1030, symmetric falloff of intensity on both sides of line 1030, or maximizing the minimum pixel intensity along the line 1030. A Hough transform is an example of a technique which can be used to perform such optimization or two-dimensional fitting. In varying examples, line 1030 can be a straight line (similar to illustrated line 1030), a parabola, another polynomial, or another function. Line 1030 can be a smooth function, or can include piecewise smooth segments.

Finally, with fitted line 1030 determined, the intercept of this line on the column of a current active slice can be used to determine the distance to target. To illustrate, the current active slice can be the rightmost column, and the intercept of line 1030 at this column can be the reference target distance indicated by arrow 1035, say 18.8 nm. Then, the distance-to-target for the current active slice can be set to 18.8 nm.

Numerous variations and extensions of this technique can be implemented within scope of the disclosed technologies. For example, pixel intensities can be transformed to increase contrast between high and low values of a closeness metric. Such a transformation can be nonlinear. The technique can also be applied to a non-periodic structure, which can be regarded as the reference and/or the active sample having a single period of a structure.

In further examples, a Hough transform or similar approach can be used to identify the central band of image 1002 around line 1030, enabling the black regions at upper right and lower left of image 1002 to be masked out. Then, successively more accurate parabolic fits to the pattern of image 1002 can be derived as follows. A random sample consensus method (RANSAC) can be used to obtain an initial parabola. Three points can be selected randomly within image 1002, subject to optional constraints. Each triplet defines a parabola of form $Y=Ax^2+Bx+C$ which can be correlated against image 1002. Multiple trials (e.g. 10,000; 1000 to 1 million; or any number from 100 to 1 billion) can be used to form a consensus as to the best fitting initial parabola for image 1002. Using this parabola, bright pixels within image 1002 can be retained according to their proximity to the initial parabola, thereby further reducing the dataset of image 1002. Finally, the retained pixels can be directly fit, e.g. by least squares technique, to obtain a refined parabola. As for line 1030, the intercept of the refined parabola on a reference line can be used as a position estimate for a given active sample.

Third Example Method

Figure 11:
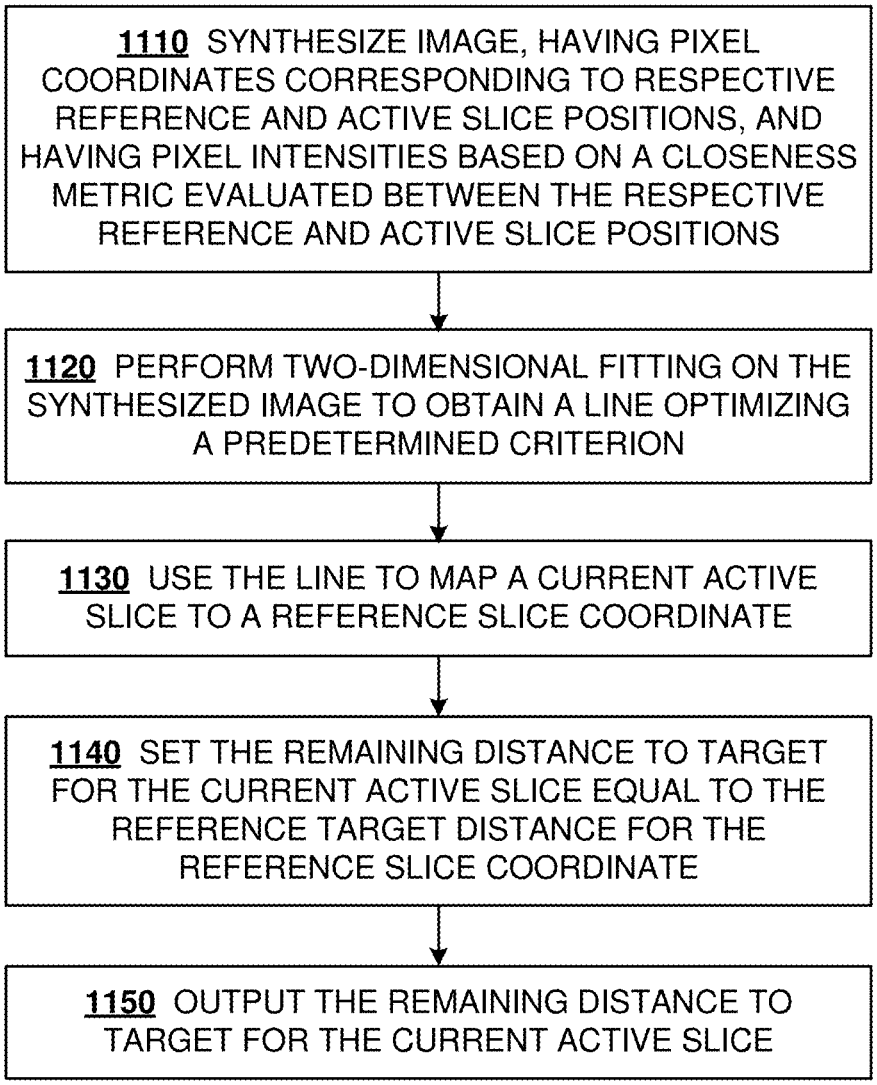
FIG. 11 is a flowchart of a third example method for determining a distance between a cut face and a target position, according to the disclosed technologies.

FIG. 11 is a flowchart 1100 of a third example method for determining a distance between a cut face and a target position using a two-dimensional fit similar to that described in context of FIG. 10. At process block 1110, an image is synthesized, with pixel coordinates representing reference slices along one axis and representing active slices along another axis. Each pixel can have an intensity dependent on a closeness metric value between the corresponding active slice and the corresponding reference slice. The reference slices can have respective predetermined distances to a reference target plane. Then, at process block 1120, a line optimizing a predetermined criterion can be determined on the synthesized image. At process block 1130, a current active slice is mapped to a reference slice coordinate using the line obtained at block 1120. At block 1140, the remaining distance to target for the current active slice is set equal to the distance to the reference target position for the reference slice position. To illustrate, the fitted line can map the current active slice to a point 10% of the way between reference slices R1 and R2, 10% of the way from R1 to R2, where the distance-to-target is respectively 10 nm and 20 nm for R1 and R2. Then, the mapped point has a distance 10+(10%)(20−10)=11 nm, and this distance value can be used as the remaining distance to target for the current active slice. In further examples, an offset can be applied if the reference and active sample target planes are offset from each other. Finally, the remaining distance to target can be outputted at block 1150.

ADDITIONAL EXAMPLES

Example 1 is an apparatus, including: an imager configured to generate an image of a cut face of a sample; and a controller configured to: acquire the image of the cut face from the imager; compare the image to one or more references; based on the comparing, determine a distance value between the cut face and a target position; and store the distance value.

Example 2 includes the subject matter of any of Examples 1, and further includes: an etcher, wherein the controller is further configured to: cause the etcher to etch the sample to a depth beyond the cut face, wherein the depth equals the distance value to within a tolerance range.

Example 3 includes the subject matter of Example 1, and further includes: an etcher, wherein the distance value is a first distance value and the controller is further configured to: responsive to the determining the first distance value, cause the etcher to iteratively etch the cut face; and as the cut face is progressively etched, repeat the acquiring, comparing, and determining operations after each of a plurality of iterations to obtain successive distance values to the target position.

Example 4 includes the subject matter of any of Examples 2-3, and further specifies that: the etcher comprises one or more of: an ion beam mill, a plasma etcher, a laser, or a gas-assist subsystem.

Example 5 includes the subject matter of any of Examples 1-4, and further specifies that the image and the cut face are preceded by one or more preceding images at respective preceding positions on the sample; and the controller is configured to determine the distance value further based on comparisons between the one or more preceding images and the references.

Example 6 includes the subject matter of any of Examples 1-5, and further specifies that the references comprise reference images of respective face positions having predetermined respective reference distances to a reference target position, and the comparing comprises: computing respective image correlations between the image and the reference images.

Example 7 includes the subject matter of Example 6, and further specifies that the determining comprises: determining the distance value based on the reference distance of a given reference image having a highest value among the computed image correlations; or performing one-dimensional fitting of three or more of the computed image correlations as a function of the respective reference distances and determining the distance value as corresponding to a maximum value of the function; or performing two-dimensional fitting on a plurality of image correlations spanning multiple positions of the cut face and including the computed image correlations at a current position of the cut face together with preceding image correlations computed for one or more preceding positions of the cut face, to obtain a fitted relationship between the reference distances of the reference images and the multiple positions of the cut face, and determining the distance value based on a value of the fitted relationship at the current position of the cut face.

Example 8 includes the subject matter of any of Examples 1-5, and further specifies that the references comprise reference values of attributes of first features at respective face positions having predetermined respective reference distances to a reference target position, and the comparing comprises: identifying one or more second features in the image corresponding to the first features; determining corresponding attribute value(s) of the second feature(s); and comparing the determined attribute value(s) with the reference values.

Example 9 includes the subject matter of Example 8, and further specifies that the comparing indicates a given face position among the face positions as having a closest match to the image, and the determining comprises: determining the distance value based on the reference distance of the given face position; or based on one-dimensional fitting of results of the comparing as a function of the respective reference distances, determining the distance value as corresponding to an optimum value of the function; or based on two-dimensional fitting of results of comparing attribute values spanning multiple positions of the cut face with the reference values, wherein the compared attribute values comprise the determined attribute value(s) at a current position of the cut face together with preceding attribute value(s) for one or more preceding positions of the cut face, obtaining a fitted relationship between the reference distances of the face positions and the multiple positions of the cut face, and determining the distance value based on a value of the fitted relationship at the current position of the cut face.

Example 10 includes the subject matter of any of Examples 7 or 9, and further specifies that the determining comprises the two-dimensional fitting and the fitted relationship is a polynomial.

Example 11 includes the subject matter of any of Examples 7, 9, or 10, and further specifies that the determining comprises the two-dimensional fitting and the two-dimensional fitting is performed graphically.

Example 12 includes the subject matter of any of Examples 1-11, and further specifies that the image is a front image, the cut face is a front cut face, the target position is a front target position, the distance value is a first distance value, the sample has a back cut face opposite to the front cut face, and the controller is further configured to: use an image of the back cut face of the sample to determine a second distance value between the back cut face and a back target position.

Example 13 includes the subject matter of Example 12, and further includes a rotatable stage upon which the sample is mounted, wherein the controller is further configured to: control the stage to rotate between a first orientation in which the imager views the front cut face and a second orientation in which the imager views the back cut face.

Example 14 includes the subject matter of any of Examples 1-13, and further specifies that the references are obtained from the sample, or from another reference sample.

Example 15 includes the subject matter of any of Examples 1-14, and further specifies that the imager is a scanning electron microscope (SEM).

Example 16 is a method, including: acquiring an image of a cut face at a first position on a sample; comparing the image with predetermined references from respective reference face positions; based on the comparing, determining a distance value from the first position to a target position; and outputting the distance value.

Example 17 includes the subject matter of Example 16, and further includes etching the sample to obtain the cut face at the first position, prior to the acquiring operation.

Example 18 includes the subject matter of any of Examples 16-17, and further specifies that the comparing the image with the predetermined references comprises computing respective closeness metric values between the image and each of the predetermined references.

Example 19 includes the subject matter of Example 18, and further specifies that each of the closeness metric values is based on one or more of: an image similarity score between the image and the respective predetermined reference; or a difference between (i) a first value of a first attribute of a first feature for the respective predetermined reference, and (ii) a second value of the first attribute of a second feature extracted from the image, wherein the first and second features are corresponding features in the respective predetermined reference and in the image, respectively.

Example 20 includes the subject matter of Example 18, and further specifies that the determining comprises: determining the distance value based on a distance-to-target of a given reference having an optimum value among the closeness metric values; or performing one-dimensional fitting of three or more of the closeness metric values as a function of the respective reference face positions and determining the distance value based on an optimum value of the function; or performing two-dimensional fitting on a plurality of metric values spanning multiple positions of the cut face and including the closeness metric values computed for the first position together with preceding closeness metric values computed for one or more preceding positions of the cut face, to obtain a fitted relationship between the reference face positions and the multiple positions of the cut face, and determining the distance value based on a value of the fitted relationship at the first position.

Example 21 includes the subject matter of any of Examples 16-20, and further specifies that the image and the cut face are preceded by one or more preceding images at respective preceding positions on the sample; and the determining is further based on comparisons between the preceding images and the predetermined references.

Example 22 includes the subject matter of Examples 21, and further specifies that the first position and the preceding positions are collectively active slice positions and the determining comprises: synthesizing another image comprising multiple pixels, wherein: each pixel has pixel coordinates corresponding to a respective one of the reference face positions along a first axis and a respective one of the active slice positions along a second axis; a plurality of the pixels have intensity values dependent on a closeness metric evaluated for the respective face position and the respective active slice position; and each reference face position has a predetermined distance to a reference target position; performing two-dimensional fitting on the synthesized image to obtain a line optimizing a predetermined criterion; using the line, mapping the first position to a coordinate along the first axis, the coordinate having a reference distance to the reference target position; and setting the distance value based on the reference distance of the coordinate.

Example 23 includes the subject matter of Example 22, and further specifies that the two-dimensional fitting is performed using a Hough transform.

Example 24 includes the subject matter of any of Examples 22-23, and further specifies that the two-dimensional fitting is performed using polynomial estimation by random sample consensus or by least squares fit.

Example 25 includes the subject matter of any of Examples 16-24, and further specifies that the image is a front image, the cut face is a front cut face, the target position is a front target position, the distance value is a first distance value, the sample has a back cut face opposite to the front cut face, and the method further comprises: using a back image of the back cut face to determine a second distance value between the back cut face and a back target position.

Example 26 includes the subject matter of any of Examples 16-25, and further includes: based on the determined distance value indicating that the first position is within a tolerance range about the target position, detaching from the sample a lamella including at least a portion of the cut face.

Example 27 includes the subject matter of any of Examples 16-26, and further specifies that the method further comprises: responsive to the determined distance value indicating that the first position is at the target position to within a predetermined tolerance range, issuing a notification indicating that the target position has been reached.

Example 28 includes the subject matter of any of Examples 16-27, and further specifies that the method further comprises: responsive to the determined distance value indicating that the first position is outside a predetermined tolerance range about the target position, further etching the sample toward the target position.

Example 29 includes the subject matter of Example 28, and further includes: modifying one or more etch control parameters prior to the further etching.

Example 30 includes the subject matter of any of Examples 16-29, and further specifies that the etching progressively increases a depth of cut in a first direction, and the sample incorporates a structure having periodicity in the first direction.

Example 31 includes the subject matter of any of Examples 16-30, and further specifies that the sample comprises a one dimensional, two-dimensional, or three-dimensional array of semiconductor devices, optoelectronic devices, or nanostructures.

Example 32 includes the subject matter of any of Examples 16-31, and further specifies that the sample comprises a one dimensional, two-dimensional, or three-dimensional array of memory cells, memory interface circuits, or transistors.

Example 33 includes the subject matter of any of Examples 16-32, and further specifies that the etching comprises one or more of: milling performed by a focused ion beam (FIB), plasma etching, laser etching, or gas-assisted milling.

Example 34 is one or more computer-readable storage media, having defined therein executable instructions which, when executed by one or more processors, actuate the one or more processors to: cause an ion beam to mill a sample to a cut face at a current position; acquire an image of the cut face from a scanning electron microscope (SEM); compare the image with predetermined references from respective reference face positions, to determine a distance value indicating a separation between the current position and a target position; if the current position is within a tolerance range relative to the target position, issuing a notification indicating that the target position has been reached; and otherwise, causing the ion beam to resume milling the sample.

Example 35 includes the subject matter of Example 34, and further specifies that execution of the instructions further actuates the one or more processors to: acquire a sequence of reference images at the reference face positions, prior to the milling to the cut face at the current position.

Example 36 includes the subject matter of Example 35, and further specifies that the predetermined references are the reference images, and the comparing comprises computing respective similarity scores between the acquired image and the reference images.

Example 37 includes the subject matter of any of Examples 35-36, and further specifies that execution of the instructions further actuates the one or more processors to: extract first features from the reference images; determine reference values of attributes of the first features, wherein the predetermined references are the reference values; identify one or more second features in the image of the cut face corresponding to the first features; and determine corresponding attribute value(s) of the second feature(s); wherein the comparing the image with the predetermined references comprises: comparing the corresponding attribute value(s) with the reference values.

A Generalized Computer Environment

Figure 12:
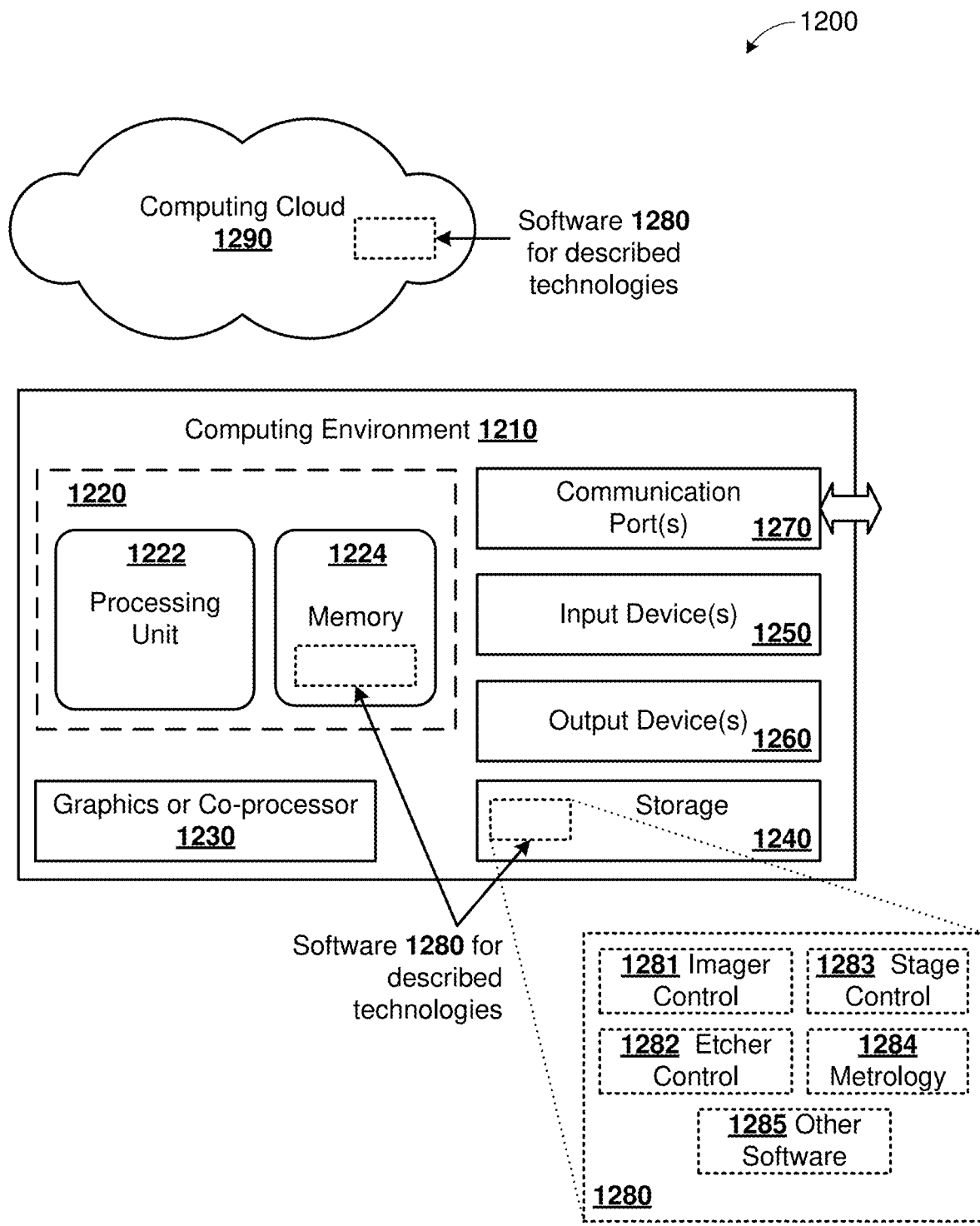
FIG. 12 illustrates a generalized example of a suitable computing environment in which described embodiments, techniques, and technologies pertaining to imaging or milling can be implemented.

FIG. 12 illustrates a generalized example of a suitable computing system 1200 in which described examples, techniques, and technologies can be implemented for monitoring an etching procedure, determining a distance between a cut face and a target position, controlling an etching procedure, or preparing a lamella. The computing system 1200 is not intended to suggest any limitation as to scope of use or functionality of the present disclosure, as the innovations can be implemented in diverse general-purpose or special-purpose computing systems. The computing system 1200 can control an SEM imaging tool, a FIB milling tool, a stage, an analytic instrument, or other similar equipment; can perform metrology or other analysis on images or other acquired data representative of a sample; can control a stage, a mill, or an imager ion beam column, or electron beam column to monitor or perform imaging or etching on a sample; or can acquire, process, output, or store measurement data.

With reference to FIG. 12, the computing environment 1210 includes one or more processing units 1222 and memory 1224. In FIG. 12, this basic configuration 1220 is included within a dashed line. Processing unit 1222 can execute computer-executable instructions, such as for control, metrology, or other functions as described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. For example, software 1280 can include software 1281 for controlling an SEM or other imaging tool, software 1282 for controlling an ion-beam mill or other etching tool, software 1283 for controlling a stage on which a sample is supported, software 1284 for performing metrology or other analysis on sample data (including reference data), or other software 1285 (including user interface, host interface, or fault detection). The inset shown for software 1280 in storage 1240 can be similarly applicable to software 1280 elsewhere in FIG. 12. The memory 1224 can also store control parameters, calibration data, measurement data, other database data, configuration data, or operational data.

A computing system 1210 can have additional features, such as one or more of storage 1240, input devices 1250, output devices 1260, or communication ports 1270. An interconnection mechanism (not shown) such as a bus, controller, or network interconnects the components of the computing environment 1210. Typically, operating system software (not shown) provides an operating environment for other software 1280 executing in the computing environment 1210, and coordinates activities of the components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein. Storage 1240 can also store image data, feature data, measurement data, workflow programs, reference data, calibration data, configuration data, sample data, or other databases or data structures described herein.

The input device(s) 1250 can be a mechanical, touch-sensing, or proximity-sensing input device such as a keyboard, mouse, pen, touchscreen, or trackball, a voice input device, a scanning device, or another device that provides input to the computing environment 1210. The output device(s) 1260 can be a display, printer, speaker, optical disk writer, or another device that provides output from the computing environment 1210. Input or output can also be communicated to/from a remote device over a network connection, via communication port(s) 1270.

The communication port(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

A data acquisition system can be integrated into computing environment 1210, either as an input device 1250 or coupled to a communication port 1270, and can include analog-to-digital converters or connections to an instrumentation bus. An instrumentation control system can be integrated into computing environment 1210, either as an output device 1260 or coupled to a communication port 1270, and can include digital-to-analog converters, switches, or connections to an instrumentation bus.

In some examples, computer system 1200 can also include a computing cloud 1290 in which instructions implementing all or a portion of the disclosed technology are executed. Any combination of memory 1224, storage 1240, and computing cloud 1290 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

GENERAL CONSIDERATIONS

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Furthermore, as used herein, the terms "or" and "and/or" mean any one item or combination of items in the phrase. Terms joined by "or" or "and/or" need not be mutually exclusive.

The systems, methods, and apparatus described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. The technologies from any example can be combined with the technologies described in any one or more of the other examples. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "acquire," "apply," "compare," "compute," "control," "detach," "determine," "etch," "extract," "fit," "identify," "mill," "produce," or "store" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "maximum," "optimum," "extremum," or the like. It will be appreciated that such descriptions are intended to indicate that a selection among a few or among many alternatives can be made, and such selections need not be lower, better, less, or otherwise preferable to other alternatives not considered.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be controlled by, or implemented as, computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The terms computer-readable media or computer-readable storage media do not include signals and carrier waves. In addition, the terms computer-readable media or computer-readable storage media do not include communication ports (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, side-loaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

In view of the many possible embodiments to which the principles of the disclosed subject matter may be applied, it should be recognized that the illustrated embodiments are only preferred examples and should not be taken as limiting the scope of the claims. Rather, the scope of the claimed subject matter is defined by the following claims. We therefore claim all that comes within the scope and spirit of these claims.

We claim:

1. An apparatus comprising:
   an imager configured to generate an image of a cut face of a sample; and
   a controller configured to:
      acquire the image of the cut face from the imager;
      compare the image to one or more references;
      based on the comparing, determine a distance value between the cut face and a target position; and
      store the distance value.

2. The apparatus of claim 1, further comprising an etcher, wherein the controller is further configured to:
   cause the etcher to etch the sample to a depth beyond the cut face, wherein the depth equals the distance value to within a tolerance range.

3. The apparatus of claim 1, further comprising an etcher, wherein the distance value is a first distance value and the controller is further configured to:
   responsive to the determining the first distance value, cause the etcher to iteratively etch the cut face; and
   as the cut face is progressively etched, repeat the acquiring, comparing, and determining operations after each of a plurality of iterations to obtain successive distance values to the target position.

4. The apparatus of claim 1, wherein the references comprise reference images of respective face positions having predetermined respective reference distances to a reference target position, and the comparing comprises:
   computing respective image correlations between the image and the reference images.

5. The apparatus of claim 1, wherein the references comprise reference values of attributes of first features at respective face positions having predetermined respective reference distances to a reference target position, and the comparing comprises:
identifying one or more second features in the image corresponding to the first features;
determining corresponding attribute value(s) of the second feature(s); and
comparing the determined attribute value(s) with the reference values.

6. The apparatus of claim 1, wherein the image is a front image, the cut face is a front cut face, the target position is a front target position, the distance value is a first distance value, the sample has a back cut face opposite to the front cut face, and the controller is further configured to:
use an image of the back cut face of the sample to determine a second distance value between the back cut face and a back target position.

7. The apparatus of claim 6, further comprising a rotatable stage upon which the sample is mounted, wherein the controller is further configured to:
control the stage to rotate between a first orientation in which the imager views the front cut face and a second orientation in which the imager views the back cut face.

8. The apparatus of claim 1, wherein the imager is a scanning electron microscope (SEM).

9. A method comprising:
acquiring an image of a cut face at a first position on a sample;
comparing the image with predetermined references from respective reference face positions;
based on the comparing, determining a distance value from the first position to a target position; and
outputting the distance value.

10. The method of claim 9, wherein the comparing the image with the predetermined references comprises computing respective closeness metric values between the image and each of the predetermined references.

11. The method of claim 10, wherein each of the closeness metric values is based on one or more of: an image similarity score between the image and the respective predetermined reference; or a difference between (i) a first value of a first attribute of a first feature for the respective predetermined reference, and (ii) a second value of the first attribute of a second feature extracted from the image, wherein the first and second features are corresponding features in the respective predetermined reference and in the image, respectively.

12. The method of claim 10, wherein the determining comprises:
determining the distance value based on a distance-to-target of a given reference having an optimum value among the closeness metric values.

13. The method of claim 10, wherein the determining comprises:
performing one-dimensional fitting of three or more of the closeness metric values as a function of the respective reference face positions; and
determining the distance value based on an optimum value of the function.

14. The method of claim 10, wherein the determining comprises:
performing two-dimensional fitting on a plurality of metric values spanning multiple positions of the cut face and including the closeness metric values computed for the first position together with preceding closeness metric values computed for one or more preceding positions of the cut face, to obtain a fitted relationship between the reference face positions and the multiple positions of the cut face; and
determining the distance value based on a value of the fitted relationship at the first position.

15. The method of claim 9, wherein the image and the cut face are preceded by one or more preceding images at respective preceding positions on the sample; and the determining is further based on comparisons between the preceding images and the predetermined references.

16. The method of claim 15, wherein the first position and the preceding positions are collectively active slice positions and the determining comprises:
synthesizing another image comprising multiple pixels, wherein:
each pixel has pixel coordinates corresponding to a respective one of the reference face positions along a first axis and a respective one of the active slice positions along a second axis;
a plurality of the pixels have intensity values dependent on a closeness metric evaluated for the respective face position and the respective active slice position; and
each reference face position has a predetermined distance to a reference target position;
performing two-dimensional fitting on the synthesized image to obtain a line optimizing a predetermined criterion;
using the line, mapping the first position to a coordinate along the first axis, the coordinate having a reference distance to the reference target position; and
setting the distance value based on the reference distance of the coordinate.

17. The method of claim 16, wherein the two-dimensional fitting is performed using a Hough transform.

18. The method of claim 16, wherein the two-dimensional fitting is performed using polynomial estimation by random sample consensus or by least squares fit.

19. The method of claim 9, further comprising:
based on the determined distance value indicating that the first position is within a tolerance range about the target position, detaching from the sample a lamella including at least a portion of the cut face.

20. The method of claim 9, wherein the method further comprises:
responsive to the determined distance value indicating that the first position is outside a predetermined tolerance range about the target position, further etching the sample toward the target position.

21. The method of claim 20, further comprising:
modifying one or more etch control parameters prior to the further etching.

22. The method of claim 9, wherein the etching progressively increases a depth of cut in a first direction, and the sample incorporates a structure having periodicity in the first direction.

23. The method of any one of claim 9, wherein the sample comprises a one dimensional, two-dimensional, or three-dimensional array of semiconductor devices, optoelectronic devices, or nanostructures.

24. One or more computer-readable storage media having defined therein executable instructions which, when executed by one or more processors, actuate the one or more processors to:
cause an ion beam to mill a sample to a cut face at a current position;

acquire an image of the cut face from a scanning electron microscope (SEM);

compare the image with predetermined references from respective reference face positions, to determine a distance value indicating a separation between the current position and a target position;

if the current position is within a tolerance range relative to the target position, issuing a notification indicating that the target position has been reached; and otherwise, causing the ion beam to resume milling the sample.

25. The one or more computer-readable storage media of claim 24, wherein execution of the instructions further actuates the one or more processors to:

acquire a sequence of reference images at the reference face positions, prior to the milling to the cut face at the current position.

26. The one or more computer-readable storage media of claim 25, wherein the predetermined references are the reference images, and the comparing comprises computing respective similarity scores between the acquired image and the reference images.

27. The one or more computer-readable storage media of claim 25, wherein execution of the instructions further actuates the one or more processors to:

extract first features from the reference images;

determine reference values of attributes of the first features, wherein the predetermined references are the reference values;

identify one or more second features in the image of the cut face corresponding to the first features; and determine corresponding attribute value(s) of the second feature(s);

wherein the comparing the image with the predetermined references comprises:

comparing the corresponding attribute value(s) with the reference values.

* * * * *